(12) United States Patent
Son

(10) Patent No.: US 7,460,521 B2
(45) Date of Patent: Dec. 2, 2008

(54) COMMUNICATION SYSTEM, CALL CONNECTION SERVER, TERMINAL APPARATUS AND COMMUNICATION METHOD

(75) Inventor: Masayoshi Son, Tokyo (JP)

(73) Assignee: SoftBank BB Corp., Tokyo (JP)

( * ) Notice: Subject to any disclaimer, the term of this patent is extended or adjusted under 35 U.S.C. 154(b) by 73 days.

(21) Appl. No.: 10/566,271

(22) PCT Filed: Nov. 21, 2003

(86) PCT No.: PCT/JP03/14939

§ 371 (c)(1),
(2), (4) Date: Sep. 27, 2006

(87) PCT Pub. No.: WO2005/013590

PCT Pub. Date: Feb. 10, 2005

(65) Prior Publication Data

US 2007/0064918 A1 Mar. 22, 2007

(30) Foreign Application Priority Data

Jul. 30, 2003 (JP) .............................. 2003-283009

(51) Int. Cl.
*H04L 12/66* (2006.01)

(52) U.S. Cl. ........................ 370/352; 455/410; 455/411; 455/435.3

(58) Field of Classification Search ................. 370/352; 455/410, 411, 435.3
See application file for complete search history.

(56) References Cited

U.S. PATENT DOCUMENTS 6,751,459 B1 * 6/2004 Lee et al. ..................... 455/445
6,958,992 B2 * 10/2005 Lee et al. ..................... 370/352

\* cited by examiner

*Primary Examiner*—Quynh H Nguyen
(74) *Attorney, Agent, or Firm*—Maier & Maier, PLLC

(57) ABSTRACT

A communication system in accordance with the present invention is provided with a terminal device and a call connection server. The terminal device comprises a personal computer 70*u* in which software is installed for performing a call connection process, and a dedicated telephone terminal 60*u* which is connected to the personal computer 70*u* and capable of digital encoding voice band signals. The call connection server comprises a SIP server 11 which performs a call connection process with the personal computer 70*u* and so forth, a database server 12 which stores related information about the users of an IP telephone service, telephone numbers and designation addresses (IP addresses) in association with each other, and a call agent 13 which performs a call connection process on the basis of the information stored in the database server 12.

23 Claims, 11 Drawing Sheets

FIG. 4

| Assigned Telephone Number | User ID | Password | Designation Address (Priority 1) | LF | Designation Address (Priority 2) | LF | Designation Address (Priority 3) | LF | Designation Address (Priority 4) | LF | Designation Address (Priority 5) | LF |
|---|---|---|---|---|---|---|---|---|---|---|---|---|
| 050-xxxx- | user-a | ******** | x.x.x.x | | 03-xxxx- | | 090-xxxx- | | Null | | Null | |
| 050-yyyy- | user-b | ******** | y.y.y.y | | 090-yyyy- | | Null | | Null | | Null | |
| ...... | | | | | | | | | | | | |

125a

| Assigned Tel. Number | Terminal ID |
|---|---|
| 050-xxxx- | U1234-5678 |
| ...... | |

| Assigned Telephone Number | User ID | Password | Designation Address (Priority 1) | LF | Designation Address (Priority 2) | LF | Designation Address (Priority 3) | LF | Designation Address (Priority 4) | LF | Designation Address (Priority 5) | LF |
|---|---|---|---|---|---|---|---|---|---|---|---|---|
| 050-xxxx- | user-a | ********* | x'.x'.x'.x' | 1 | x.x.x.x | | 03-xxxx- | | 090-xxxx- | | Null | | ically, for connecting IP telephone calls to predeter-
COMMUNICATION SYSTEM, CALL CONNECTION SERVER, TERMINAL APPARATUS AND COMMUNICATION METHOD

FIELD OF THE INVENTION

The present invention relates to a communication system, a call connection server, a terminal device and a communication method for providing a voice communication service, particularly, for connecting IP telephone calls to predetermined designation addresses.

BACKGROUND ART

With the advent of communication technology, IP telephone services have been started to provide functionality equivalent to the traditional plain old telephone system (POTS).

In such an IP telephone service, the network of the IP telephone service and the network of the plain old telephone system are connected to each other for the purpose of providing communication between the users of the IP telephone service and the users of the plain old telephone system and so forth. Accordingly, if a user uses both services, for example, a call at the telephone number of the IP telephone service assigned to him can be transferred to the telephone number of the plain old telephone system assigned to him.

Also, in the case of an IP telephone service, the user can perform communication at an arbitrary location on a network (IP network), through which IP packets can be transferred, by connecting an arbitrary telephone terminal device (IP telephone terminal) provided with the capability of utilizing the IP telephone service or a personal computer provided with this capability.

However, in order to connect a call to the terminal device and the like at an arbitrary location on the network, the user has to rewrite information such as the IP address of a terminal device in advance registered in a call connection server responsible for connecting calls on the IP network by making use of the redirect mode of SIP (Session Initiation Protocol) which is defined in IETF RFC 2543. In addition, while rewriting such information is permitted typically by a user ID and a password, however, there is a problem that it is not impossible to steal a user ID and a password.

Furthermore, in order to realize the call transfer as described above, there is a problem that the user has to rewrite the information about the forwarding address in a database which is referred to by the call connection server through a Web site and the like every time the terminal device is connected.

The present invention is invented taking into consideration the above problem, and it is an object thereof to provide a communication system, a call connection server, a terminal device and a communication method for automatically transmitting from a terminal device the information for identifying the terminal device and the information for indicating the location of the terminal device on a network, changing the information of the call connection server on the basis of the information as transmitted, and thereby connecting a call at a predetermined telephone number to the terminal device.

SUMMARY OF THE INVENTION

In accordance with a first feature of the present invention, a communication system is provided with a terminal device and a call connection server operable to connect a call at a predetermined telephone number to the terminal device on the basis of a designation address which is associated with the predetermined telephone number, the terminal device comprising: a registration information transmitting unit operable to transmit, when connecting with a network which can be used for communication with the call connection server, to the call connection server a terminal identifier for identifying the terminal device and a terminal location address for identifying the location thereof on the network with which the terminal device is connected, the call connection server comprising: a storing unit operable to store the designation address and the terminal identifier in association with the predetermined telephone number; a registration information receiving unit operable to receive the terminal identifier and the terminal location address; an authentication unit operable to authenticate the terminal device on the basis of the terminal identifier which is received and the terminal identifier which is stored in the storing unit; a priority designation address setting unit operable to associate, when the terminal device is authenticated by the authentication unit, the terminal location address as received and the predetermined telephone number, which is stored in the storing unit in association with the terminal identifier, and set the terminal location address as a priority designation address which is given a priority higher than the designation address; and a call connection unit operable to connect the call to the terminal device on the basis of the terminal location address in the case where the priority designation address has been set up.

In accordance with the above feature, the call at the predetermined telephone number is connected with the terminal device on the basis of the terminal location address as transmitted from the terminal device, and thereby the user can receives the call at the predetermined telephone number with the terminal device.

In accordance with the above feature, since the terminal location address as transmitted from the personal computer 70$u$ is automatically set as a priority designation address accorded priority over the designation address, it is possible to avoid the shortcoming that the user U has to manually change the designation address.

In accordance with the above feature, since the terminal device is authenticated on the basis of the terminal identifier as transmitted from the terminal device and the terminal identifier as stored in the storing unit, it is possible to determine whether or not a service is to be provided for the terminal device without the use of the user ID and the password.

In accordance with a second feature of the present invention, in addition to the first feature of the present invention, the call connection server further comprises a detection unit operable to detect that the terminal device is disconnected from the network, wherein when the detection unit detects that the terminal device is disconnected from the network, the priority designation address setting unit deregisters the priority designation address as set.

In accordance with the above feature, since the priority designation address as set is disconnected when the detection unit detects that the terminal device is disregistered from the network, and thereby it is possible to connect a call at the predetermined telephone number on the basis of the designation address which is prepared in the storing unit in the case where the terminal device is disconnected from the network.

In accordance with a third feature of the present invention, in addition to the first feature of the present invention, the storing unit is operable to further store, in association with the predetermined telephone number, a user identifier for identifying a user who utilizes the predetermined telephone number and a password associated with the user identifier, wherein the registration information transmitting unit is operable to further transmit the user identifier and the password to the call connection server; wherein the registration information receiving unit is operable to receive the user identifier and the password; and wherein the authentication unit is operable to authenticate the terminal device on the basis of the terminal identifier, the user identifier and the password as received.

In accordance with the above feature, the terminal device is authenticated on the basis of the user identifier and the password in addition to the terminal identifier as transmitted from the terminal device, and thereby it is possible to improve the security against the illegal usage of the service.

In accordance with a fourth feature of the present invention, in addition to the first feature of the present invention, the terminal device further comprises a terminal identifier storing unit operable to store the terminal identifier in order that the terminal identifier can be read only by the registration information transmitting unit, wherein the registration information transmitting unit is operable to transmit the terminal identifier as read from the terminal identifier storing unit to the call connection server.

In accordance with the above feature, since the terminal device is provided further with the terminal identifier storing unit from which only reading the terminal identifier is allowed while the registration information transmitting unit transmits the terminal identifier as read from the terminal identifier storing unit, it is possible to prevent the terminal identifier from being changed by the user and so forth, and improve the security against the illegal usage of the service.

In accordance with a fifth feature of the present invention, in addition to the third feature of the present invention, the terminal device further comprises a user information storing unit operable to store the user identifier and the password, wherein the registration information transmitting unit is operable to transmit the terminal identifier and the user identifier and password stored in the user information storing unit to the call connection server.

In accordance with the above feature, since the terminal device is provided further with the user information storing unit capable of storing the user identifier and the password while the registration information transmitting unit transmits the user identifier and the password as stored in the terminal identifier storing unit and the user information storing unit, it is possible to avoid the shortcoming that the user has to enter the user identifier and the password every time the connection is made.

In accordance with a sixth feature of the present invention, in addition to the first feature of the present invention, the terminal device includes: a private base station apparatus that can be connected with the network; and a mobile terminal device provided with the registration information transmitting unit and connectable with the network by wireless communication through either a public wireless base station or the private base station apparatus, wherein the mobile terminal device can perform wireless communication with the private base station apparatus by the use of the same protocol as it uses for the wireless communication with the public wireless base station.

In accordance with the above feature, the same protocol can be used for accessing the network commonly through the public wireless base station and the private base station apparatus, and thereby the user can operate without awareness of which of the base stations is connected.

In accordance with a seventh feature of the present invention, in addition to the sixth feature of the present invention, each of the mobile terminal device and the private base station apparatus is provided with: a first communication interface operable on the basis of the above protocol; a second communication interface operable for local communication; and a switch unit operable to switch between the first communication interface and the second communication interface in accordance with the manipulation of a user.

In accordance with the above feature, it is possible to selectively use wireless communication on the basis of the same protocol as used in the public wireless base station and local wireless communication such as wireless LAN, and to perform operations depending upon the communication environment.

In accordance with an eighth feature of the present invention, in addition to the seventh feature of the present invention, the private base station apparatus is provided with: an adapter unit which is removably attached to a computer; and a communication antenna unit operable for wireless communication with the mobile terminal device.

In accordance with the above feature, it is possible to make use of the present system in the same manner as usual by carrying the private base station apparatus even in the location where radio waves cannot reach from the public wireless base, such as an abroad location, as long as there is a personal computer available for connecting with the network.

In accordance with a ninth feature of the present invention, a call connection server is operable to connect a call at a predetermined telephone number to a terminal device on the basis of a designation address which is associated with the predetermined telephone number, and comprises: a storing unit operable to store the designation address and the terminal identifier in association with the predetermined telephone number; a registration information receiving unit operable to receive, when the terminal device is connected with a network which can be used for communication with the call connection server, from the terminal device a terminal identifier for identifying the terminal device and a terminal location address for identifying the location thereof on the network with which the terminal device is connected, an authentication unit operable to authenticate the terminal device on the basis of the terminal identifier which is received and the terminal identifier which is stored in the storing unit; a priority designation address setting unit operable to associate, when the terminal device is authenticated by the authentication unit, the terminal location address as received and the predetermined telephone number, which is stored in the storing unit in association with the terminal identifier, and set the terminal location address as a priority designation address which is given a priority higher than the designation address; and a call connection unit operable to connect the call to the terminal device on the basis of the terminal location address in the case where the priority designation address has been set up.

In accordance with a tenth feature of the present invention, in addition to the ninth feature of the present invention, there is further provided a detection unit operable to detect that the terminal device is disconnected from the network, wherein when the detection unit detects that the terminal device is disconnected from the network, the priority designation address setting unit deregisters the priority designation address as set.

In accordance with an eleventh feature of the present invention, in addition to the ninth feature of the present invention, the storing unit is operable to further store, in association with the predetermined telephone number, a user identifier for identifying a user who utilizes the predetermined telephone number and a password associated with the user identifier, wherein the registration information receiving unit is operable to further receive the user identifier and the password from the terminal device; and wherein the authentication unit is operable to authenticate the terminal device on the basis of the terminal identifier, the user identifier and the password as received.

In accordance with a twelfth feature of the present invention, a terminal device is operable in order that a call at a predetermined telephone number to it on the basis of a designation address which is associated with the predetermined telephone number, wherein a call connection server receives a terminal identifier for identifying the terminal device and a terminal location address for identifying the location thereof on the network which can be used for communication with the call connection server from the terminal device, and associates the terminal location address as received and the predetermined telephone number, and sets the terminal location address as a priority designation address which is given a priority higher than the designation address; and wherein the terminal device is provided with a registration information transmitting unit operable to transmit, when it is connected with the network, the terminal identifier and the terminal location address to the call connection server.

In accordance with a thirteenth feature of the present invention, in addition to the twelfth feature of the present invention, there is further provided a terminal identifier storing unit operable to store the terminal identifier in order that the terminal identifier can be read only by the registration information transmitting unit, wherein the registration information transmitting unit is operable to transmit the terminal identifier as read from the terminal identifier storing unit to the call connection server.

In accordance with a fourteenth feature of the present invention, in addition to the twelfth feature of the present invention, the call connection server is operable to authenticate the terminal device on the basis of the terminal identifier, a user identifier for identifying a user who utilizes the predetermined telephone number and the user identifier; wherein the terminal device further comprises: a user information storing unit operable to store the user identifier and the password; and wherein the registration information transmitting unit is operable to transmit the terminal identifier and the user identifier and password stored in the user information storing unit to the call connection server.

In accordance with a fifteenth feature of the present invention, in addition to the twelfth feature of the present invention, the terminal device includes: a private base station apparatus that can be connected with the network; and a mobile terminal device provided with the registration information transmitting unit and connectable with the network by wireless communication through either a public wireless base station or the private base station apparatus, wherein the mobile terminal device can perform wireless communication with the private base station apparatus by the use of the same protocol as it uses for the wireless communication with the public wireless base station.

In accordance with a sixteenth feature of the present invention, in addition to the fifteenth feature of the present invention, each of the mobile terminal device and the private base station apparatus is provided with: a first communication interface operable on the basis of the above protocol; a second communication interface operable for local communication; and a switch unit operable to switch between the first communication interface and the second communication interface in accordance with the manipulation of a user.

In accordance with a seventeenth feature of the present invention, in addition to the fifteenth feature of the present invention, the private base station apparatus is provided with: an adapter unit which is removably attached to a computer; and a communication antenna unit operable for wireless communication with the mobile terminal device.

In accordance with an eighteenth feature of the present invention, a communication method is operable with a terminal device and a call connection server operable to connect a call at a predetermined telephone number to the terminal device on the basis of a designation address which is associated with the predetermined telephone number, wherein the call connection server is operable to store the designation address and the terminal identifier in association with the predetermined telephone number, the communication method comprising: a step (A) in which, when the terminal device is connected with a network which can be used for communication with the call connection server, the call connection server receives from the terminal device a terminal identifier for identifying the terminal device and a terminal location address for identifying the location thereof on the network with which the terminal device is connected, a step (B) in which the call connection server authenticates the terminal device on the basis of the terminal identifier and the terminal identifier as stored; a step (C) in which, when the terminal device is authenticated in the step (B), the call connection server associates the terminal location address as received and the predetermined telephone number, which is stored in association with the terminal identifier, and sets the terminal location address as a priority designation address which is given a priority higher than the designation address; and a step (D) in which, in the case where the priority designation address has been set up, the call connection server connects the call to the terminal device on the basis of the terminal location address.

In accordance with a nineteenth feature of the present invention, in addition to the eighteenth feature of the present invention, there are further provided a step (E) in which the call connection server detects that the terminal device is disconnected from the network; and a step (F) in which, when it is detected in the step (E) that the terminal device is disconnected from the network, the server deregisters the priority designation address which is set in the step (C).

In accordance with a twentieth feature of the present invention, in addition to the eighteenth feature of the present invention, a user identifier for identifying a user who utilizes the predetermined telephone number and a password associated with the user identifier are further stored in association with the predetermined telephone number, wherein the call connection server receives the user identifier and the password from the call connection server in the step (A), wherein the call connection server authenticates the terminal device on the basis of the terminal identifier, the user identifier and the password as received in the step (B).

In accordance with a twenty-first feature of the present invention, in addition to the eighteenth feature of the present invention, the call connection server receives the terminal identifier, which is stored inside of the terminal device so that it can only be read, from the terminal device in the step (A).

In accordance with a twenty-second feature of the present invention, in addition to the twentieth feature of the present invention, the call connection server receives the user identifier and the password, which are stored inside of the terminal device, from the terminal device in the step (A).

In accordance with a twenty-third feature of the present invention, in addition to the eighteenth feature of the present invention, the terminal device includes: a private base station apparatus that can be connected with the network; and a mobile terminal device provided with the registration information transmitting unit and connectable with the network by wireless communication through either a public wireless base station or the private base station apparatus, and wherein the mobile terminal device connects with the network in the step (A) by establishing wireless communication with the private base station apparatus by the use of the same protocol as it uses for the wireless communication with the public wireless base station.

BRIEF DESCRIPTION OF THE DRAWINGS

FIG. 4 is a view for showing the configuration of a database in accordance with the first embodiment.

FIG. 6 is a view for showing the content of the database when a terminal device is connected with a network in accordance with the first embodiment.

BEST MODE FOR CARRYING OUT THE INVENTION

First Embodiment

Figure 1:
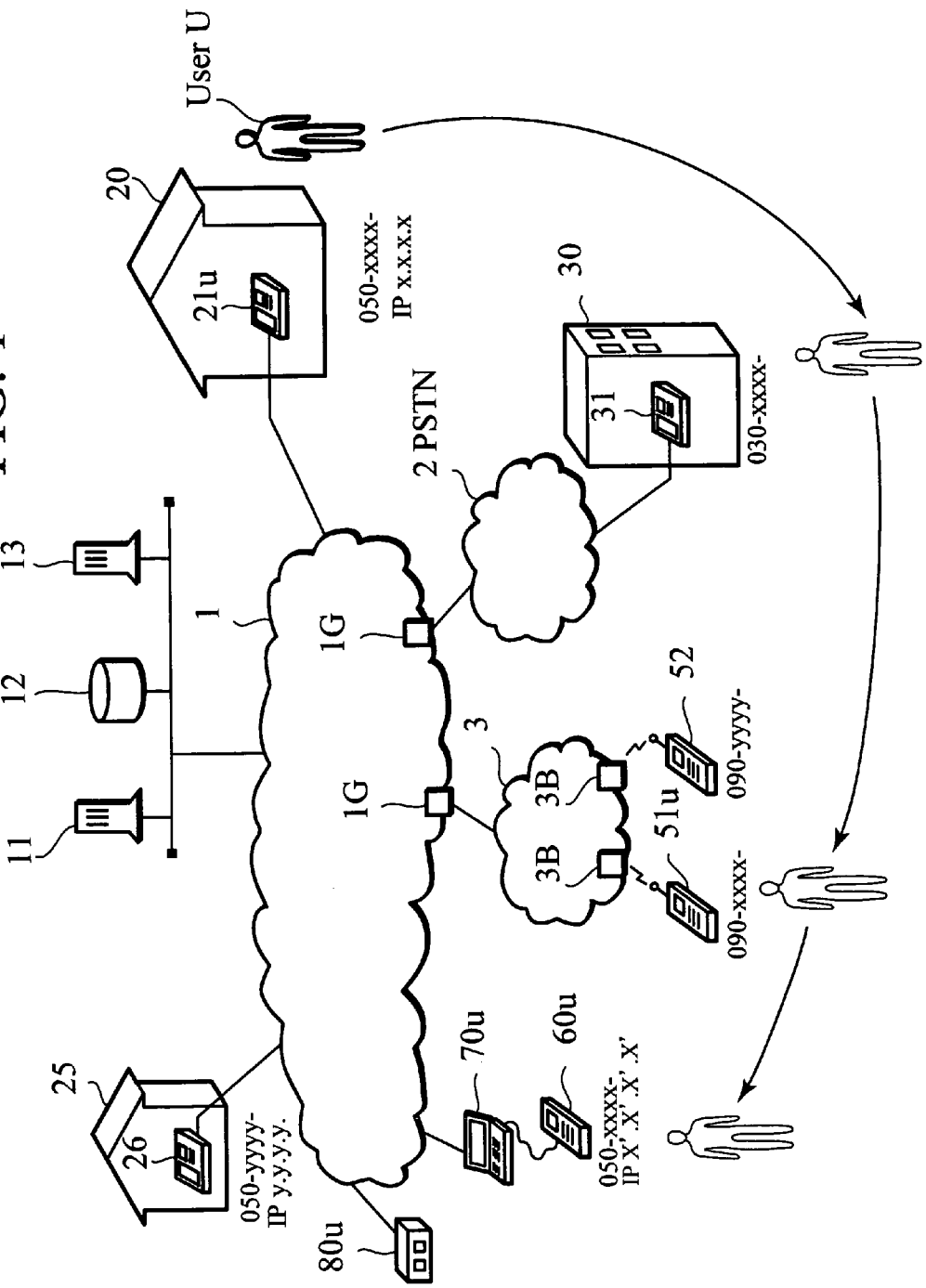
FIG. 1 is a view for schematically showing the configuration of the network of a communication system in accordance with the first embodiment.

Network Configuration of the Communication System in Accordance with the First Embodiment The first embodiment of the present invention will be explained with reference to the accompanying drawings. FIG. 1 is a view for schematically showing the configuration of the network of an IP telephone service including the communication system in accordance with the present embodiment.

As shown in FIG. 1, in the case of the present embodiment, a terminal system comprises a personal computer 70u in which software is installed for performing a call connection process, and a dedicated telephone terminal 60u which is connected to the personal computer 70u and capable of digital encoding voice band signals. Alternatively, the personal computer 70u can be replaced by a personal digital assistant (PDA) in which software is installed for performing a call connection process.

Furthermore, in the case of the present embodiment, it is possible to provide an equivalent capabilities as in the personal computer 70u also by a dedicated terminal adapter 80u capable of performing a call connection process and digital encoding voice band signals.

The dedicated terminal adapter 80u is characterized in that the size is small as the jacket of a CD and therefore it is easy to carry it because of its compact and light-weight structure. Furthermore, as compared with the personal computer 70u, the dedicated terminal adapter 80u does not require starting and manipulating software and thereby the same service can be used also by the users who don't utilize personal computers. Incidentally, in the following description, the personal computer 70u is used in the exemplary case.

The personal computer 70u can be connected with the IP network 1, at an arbitrary location thereof, which is a network for transferring IP packets and providing the IP telephone service.

In addition, IP telephone terminals 21u and 26 are connected with the IP network 1 for transmitting and receiving IP packets on the basis of VoIP (Voice over IP). The IP telephone terminal 21u is placed in a user's house 20 which is the residence of a user U and addressable at a telephone number [050-xxxx-] and an IP address [x.x.x.x]. On the other hand, the IP telephone terminal 26 is placed in a user's house 25 which is the residence of another user and addressable at a telephone number [050-yyyy-] and an IP address [y.y.y.y]. Incidentally, these IP telephone terminals can be replaced by a VoIP gateway for converting between voice band signals and IP packets and an ordinary telephone terminal (analog telephone terminal) capable of transmitting and receiving voice band signals.

In the case of the present embodiment, the IP network 1 is connected with a PSTN 2, which serves to provide a telephone service on the basis of a circuit switching system, via a gateway 1G capable of performing necessary signal conversion. The PSTN 2 is connected with an ordinary telephone terminal 31 capable of transmitting and receiving voice band signals. The ordinary telephone terminal 31 is placed in an office 30 of the user U and given a telephone number [03-xxxx-].

Furthermore, in the case of the present embodiment, the IP network 1 is connected with a mobile telephone network 3, which provides a mobile telephone service, via a gateway 1G. The mobile telephone network 3 is connected with mobile telephone terminals 51u and 52 through wireless base stations 3B. The mobile telephone terminal 51u is a mobile telephone terminal used by the user U and given a telephone number [090-xxxx-]. Also, the mobile telephone terminal 52 is a mobile telephone terminal used by the user of the user's house 25 in which the IP telephone terminal 26 is placed, and given a telephone number [090-yyyy-].

Furthermore, in the case of the present embodiment, a call connection server is made up of a SIP server 11, a database server 12 and a call agent 13.

The SIP server 11 serves to perform a call connection process with the personal computer 70u and so forth. Also, when the dedicated telephone terminal 60u is connected with the IP network 1 through the personal computer 70u, the SIP server 11 acquires information required for call connection such as an IP address, and transmits the information to the database server 12.

The database server 12 stores related information about the users of the IP telephone service, telephone numbers and designation addresses (IP addresses) in association with each other.

The call agent 13 serves to perform a call connection process on the basis of the information stored in the database server 12. Incidentally, when there is a call for the dedicated telephone terminal 60u connected to the IP network 1 through the personal computer 70u, the call agent 13 can transmit information such as an IP address required for call connection to the SIP server 11. Meanwhile, the respective functions of the SIP server 11, the database server 12 and the call agent 13 can be integrally implemented within a single hardware unit.

(Outline of the Operation of the Communication System in Accordance with the Embodiment of the Present Invention)

Next, the general outline of the communication system in accordance with the present embodiment as described above will be explained.

For example, in the case where the user of the user's house 25 directs a call from the IP telephone terminal 26 to the IP telephone terminal 21u used by the user U and placed in the user's house 20, at first, the call agent 13 receives the telephone number [050-xxxx-] assigned to the IP telephone terminal 21u from the IP telephone terminal 26 together with the IP address [y.y.y.y]. Then, the call agent 13 refers to the database server 12 on the basis of the telephone number [050-xxxx-] as received.

In this case, for example, the database server 12 stores information as shown in a telephone number table 125a of FIG. 4. The call agent 13 acquires the IP address [x.x.x.x] which is an entry of "Designation Address (Priority 1)" in the telephone number table 125a corresponding to [050-xxxx-] which is an entry of "Assigned Telephone Number". The call agent 13 connects the IP telephone terminal 26 and the IP telephone terminal 21u on the basis of the IP address [x.x.x.x] as acquired from the database server 12 and the IP address [y.y.y.y] as received from the IP telephone terminal 26.

In addition to this, the database server 12 of the present embodiment can store the telephone numbers of forwarding addresses to which calls at predetermined telephone numbers are transferred. For example, in the telephone number table 125a, the assigned telephone number [050-xxxx-] is associated with the IP address [x.x.x.x] stored as an entry of "Designation Address (Priority 1)" as described above and also with the telephone number [03-xxxx-] of the ordinary telephone terminal 31 used by the user U in the office 30 as an entry of "Designation Address (Priority 2)". Furthermore, the assigned telephone number [050-xxxx-] is associated with the telephone number [090-xxxx-] of the mobile telephone terminal 51u used by the user U and stored as an entry of "Designation Address (Priority 3)".

The user U can store the telephone number of the ordinary telephone terminal 31 and the telephone number of the mobile telephone terminal 51u in the database server 12 through the Internet and the like.

In the case where a plurality of designation addresses are stored in the database server 12, the call agent 13 connects a call at the assigned telephone number ([050-xxxx-]) on the basis of the priority levels of the designation addresses.

For example, while the call agent 13 calls the IP telephone terminal 21u on the basis of the IP address [x.x.x.x] stored as "Designation Address (Priority 1)", if the IP telephone terminal 21u does not answer the call from the call agent 13 within a predetermined time period, the call agent 13 stops calling the IP telephone terminal 21u and can redirect the call to the ordinary telephone terminal 31 on the basis of the telephone number [03-xxxx-] stored as "Designation Address (Priority 2)". Also, the user U can change the priority levels of a plurality of the "designation addresses" in accordance with the time of day by further storing predetermined information in the database server 12.

By the operations of the database server 12 and the call agent 13 as has been discussed above, it is possible to transfer a call at the telephone number [050-xxxx-] used by the user U to a predetermined telephone terminal in accordance with the location where the user U stays.

Furthermore, in the case of the present embodiment, when the user U connects the dedicated telephone terminal 60u to the IP network 1 through the personal computer 70u, the IP address assigned to the personal computer 70u is set through the SIP server 11 as an entry of "Designation Address" stored in the database server 12 as described above. Incidentally, the procedure of changing an entry of "Designation Address" will more specifically be described below.

Accordingly, the user U can receive a call at the telephone number [050-xxxx-], for example even when traveling and so forth, through the use of the personal computer 70u and the dedicated telephone terminal 60u without changing "Designation Address" stored in the database server 12 by himself by connecting the dedicated telephone terminal 60u to the IP network 1 through the personal computer 70u.

Since the communication system in accordance with the present embodiment operates as has been discussed above, the user U can selectively use two telephone terminals, i.e., the IP telephone terminal 21u and the dedicated telephone terminal 60u which are associated with the same telephone number [050-xxxx-] without performing the change of "Designation Address" and so forth.

(Configuration of the Terminal System in Accordance with an Embodiment of the Present Invention)

Next, with reference to FIG. 2, the function block configuration of the personal computer 70u and the dedicated telephone terminal 60u will be explained.

Figure 2:
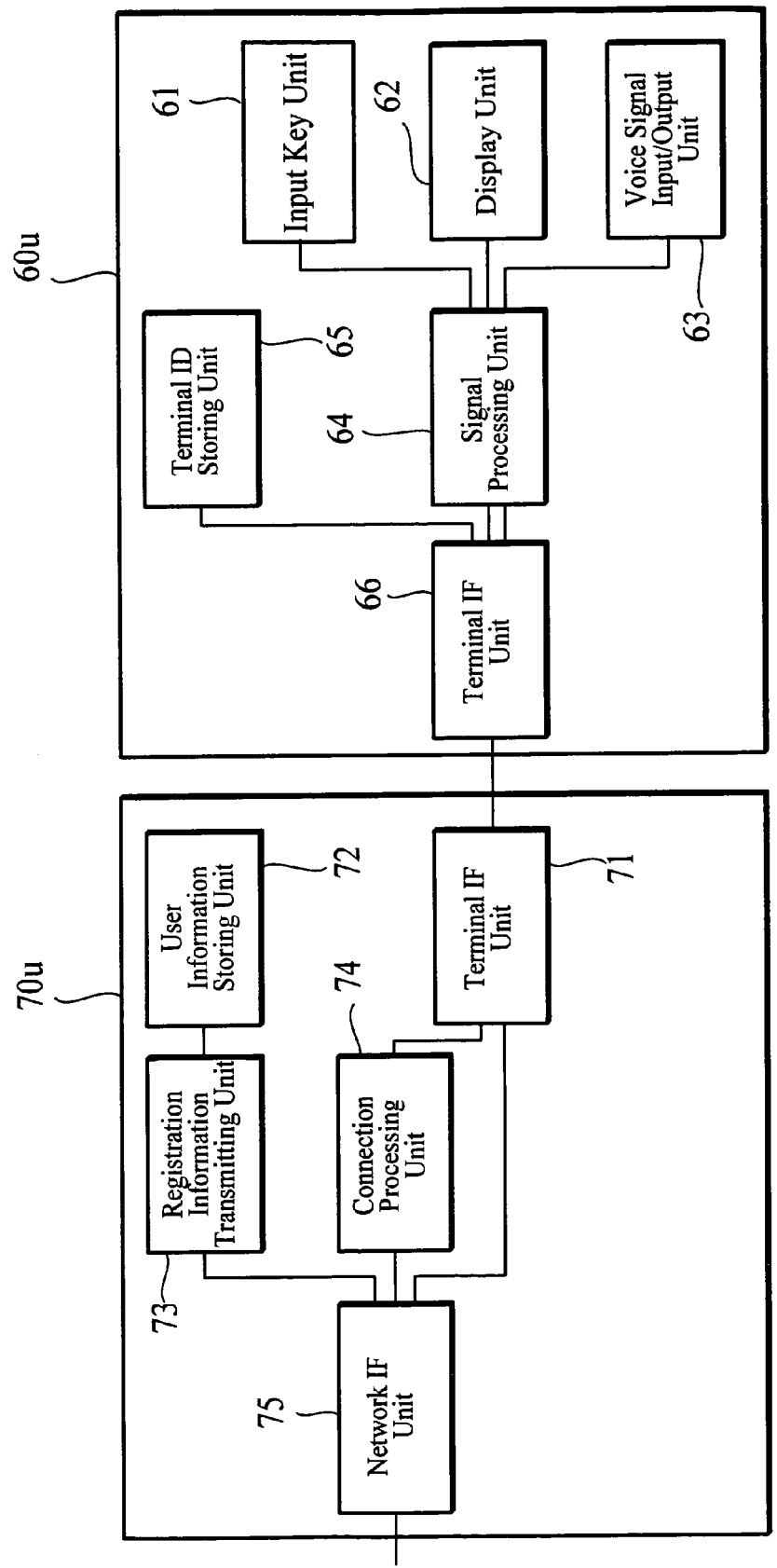
FIG. 2 is a view for showing the configuration of the function blocks of a terminal device in accordance with the first embodiment.

As shown in FIG. 2, the dedicated telephone terminal 60u includes an input key unit 61, a display unit 62, a voice signal input/output unit 63, a signal processing unit 64, a terminal ID storing unit 65 and a terminal IF unit 66.

The input key unit 61 is used to input numerals such as a telephone number and desired characters. The data of numerals and characters as input through the input key unit 61 is transmitted to the signal processing unit 64.

The display unit 62 serves to display the content of the data input through the input key unit 61, the telephone number of the caller, and so forth, and connected to the signal processing unit 64.

The voice signal input/output unit 63 is provided with a microphone and a speaker and serves to transmit and receive voice band signals to and from the signal processing unit 64.

The signal processing unit 64 serves to perform conversion between digital signals in conformity with a predetermined standard and voice band signals transmitted to and received from the voice signal input/output unit 63. Also, the signal processing unit 64 are connected with the input key unit 61 and the display unit 62 in order to transmit and receive data such as a telephone number.

For example, the signal processing unit 64 can be implemented with a codec in compliance with ITU-T G.729a/c. Furthermore, the signal processing unit 64 serves to perform conversion between IP packets and digitized data such as voice signals and a telephone number, and transmit and receive the digitized data to and from the terminal IF unit 66.

The terminal ID storing unit 65 serves to store a terminal ID (terminal identifier) assigned to the dedicated telephone terminal 60u in order that it can be read only by the personal computer 70u.

In this case, the terminal ID assigned to the dedicated telephone terminal 60u is an identifier unique to the dedicated telephone terminal 60u. In the case of the present embodiment, a serial number in the form of [Uxxxx-xxxx] is used, and [U1234-5678] is assigned to the dedicated telephone terminal 60u. Meanwhile, the terminal ID is stored in the database server 12 in association with the telephone number [050-xxxx-] used by the user U. Alternatively, instead of the serial number in the form of [Uxxxx-xxxx], the MAC (Media Access Control) address of the dedicated telephone terminal 60u can be used as the terminal ID.

The serial number is written to a FLASH memory and the like in order that it cannot be rewritten for the purpose of illegally using the IP telephone service. Accordingly, it is difficult to change the serial number, and thereby the security against the illegal usage of the IP telephone service can be improved.

The terminal IF unit 66 provides an interface for connecting with the personal computer 70u. For example, the terminal IF unit 66 can be implemented with a USB (Universal Serial Bus) interface or a wireless LAN interface in compliance with IEEE 802.11.

The personal computer 70u includes a terminal IF unit 71, a user information storing unit 72, a registration information transmitting unit 73, a connection processing unit 74 and a network IF unit 75.

The terminal IF unit 71 is provided with an interface for connecting with the dedicated telephone terminal 60u. For example, the terminal IF unit 71 can be implemented with a USB (Universal Serial Bus) interface or a wireless LAN interface in compliance with IEEE 802.11.

The user information storing unit 72 serves to store a user ID for identifying the user U and a password associated with the user ID. In the case of the present embodiment, the user information storing unit 72 stores the user ID [user_a] of the user U and a password associated with this user ID. Also, the user ID and the password are stored in the database server 12 in association with the telephone number [050-xxxx-] used by the user U.

When the dedicated telephone terminal 60u is connected with the IP network 1 through the personal computer 70u, the user ID and the password stored in the user information storing unit 72 are automatically transmitted to the SIP server 11 together with the terminal ID, and thereby it is possible to avoid the shortcoming that the user U has to enter information such as the user ID every time the connection is made.

Also, when the dedicated telephone terminal 60u is connected through the personal computer 70u with the IP network 1 which can be used for communication with the SIP server 11, the registration information transmitting unit 73 transmits to the SIP server 11 the terminal ID for identifying the dedicated telephone terminal 60u and the address for identifying the location of the terminal on the IP network 1 at which the personal computer 70u is connected, i.e., the IP address [x'.x'.x'.x'] for identifying the location of the personal computer 70u connected to the IP network 1.

In addition to this, the registration information transmitting unit 73 can further transmit the user ID and the password of the user U to the SIP server 11. In this case, it is determined in accordance with the security level as required whether or not the user ID and the password are transmitted in addition to the terminal ID and the IP address.

The connection processing unit 74 serves to communicate with the SIP server 11 through the network IF unit 75. More specifically speaking, the connection processing unit 74 transmits to the SIP server 11 the terminal ID [U1234-5678], the IP address [x'.x'.x'.x'], the user ID [user_a] and the password on the basis of SIP (Session Initiation Protocol). Furthermore, when the IP address [x'.x'.x'.x'] as transmitted is registered in the database server 12, the connection processing unit 74 receives the information (the "expires" parameter of the SIP header) indicative of the registration effective period of the IP address from the SIP server 11. The connection processing unit 74 transmits the IP address, the user ID and the password to the SIP server 11 again in advance of the expiration of the registration effective period on the basis of information on the registration effective period of the IP address as received, in order to register the IP address in the database server 12 again.

Also, the connection processing unit 74 performs the call connection process between the SIP server 11 and the dedicated telephone terminal 60u, i.e., at the telephone number [050-xxxx-] used by the user U on the basis of SIP (Session Initiation Protocol). Furthermore, the connection processing unit 74 periodically determines whether or not the dedicated telephone terminal 60u is connected with the personal computer 70u through the terminal IF unit 71. When the dedicated telephone terminal 60u is disconnected from the terminal IF unit 71, the connection processing unit 74 notifies this fact to the SIP server 11.

The network IF unit 75 is provided with an interface connectable to the IP network 1. For example, the network IF unit 75 can be implemented with a LAN interface such as 100BASE-TX in compliance with IEEE802.3u. Incidentally, an ADSL (Asymmetric Digital Subscriber Line) modem may also be used to make the connection between the IP network 1 and the personal computer 70u depending upon the type of the communication line used for accessing the IP network 1.

(Configuration of the Call Connection Server in Accordance with an Embodiment of the Present Invention)

Next, the configuration of the respective function blocks of the call connection server in accordance with the present embodiment, i.e., the SIP server 11, the database server 12 and the call agent 13 will be explained with reference to FIG. 3.

Figure 3:
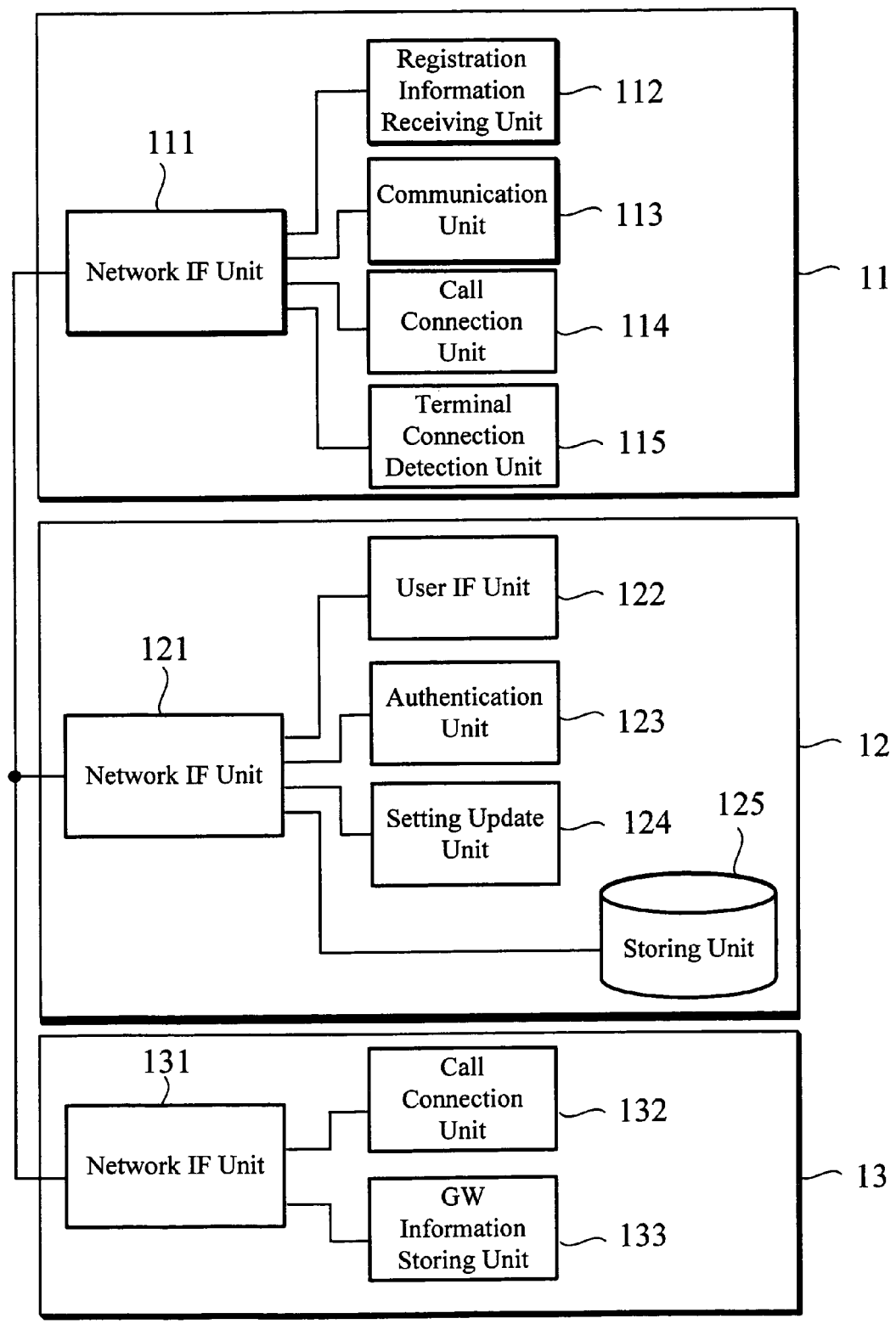
FIG. 3 is a view for showing the configuration of the function blocks of a call connection server in accordance with the first embodiment.

As shown in FIG. 3, the SIP server 11 includes a network IF unit 111, a registration information receiving unit 112, a communication unit 113, a call connection unit 114 and a terminal connection detection unit 115.

The network IF unit 111 is provided with an interface for connecting with the database server 12, the call agent 13 and the IP network 1. The network IF unit 111 can be implemented with a LAN interface such as 100BASE-TX or 1000BASE-TX.

The registration information receiving unit 112 serves to receive the terminal ID [U1234-5678] of the dedicated telephone terminal 60u, and the IP address [x'.x'.x'.x'] of the location of the IP network 1 at which the personal computer 70u is connected.

Also, the registration information receiving unit 112 may further receive the user ID [user_a] and the password in addition to the terminal ID [U1234-5678] and the IP address [x'.x'.x'.x']. Furthermore, the registration information receiving unit 112 transmits the terminal ID [U1234-5678], the IP address [x'.x'.x'.x'] and the user ID [user_a] as received to the database server 12.

The communication unit 113 serves to perform a communication process with the personal computer 70u.

More specifically speaking, the communication unit 113 receives the IP address [x'.x'.x'.x'], the terminal ID [U1234-5678], the user ID [user_a] and the password from the personal computer 70u or the dedicated telephone terminal 60u by the use of the "REGISTER" message defined by SIP. Also, in the case where the IP address [x'.x'.x'.x'] is registered in the database server 12, the communication unit 113 transmits a response containing information indicative of the registration effective period of the IP address to the personal computer 70u. The communication unit 113 can arbitrarily designate the registration effective period of the IP address [x'.x'.x'.x'] by means of the "expires" parameter of the SIP header.

The call connection unit 114 serves to connect a call at the telephone number [050-xxxx-] used by the user U to the personal computer 70*u* on the basis of the notification from the call agent 13.

The terminal connection detection unit 115 serves as a detection unit which detects that the dedicated telephone terminal 60*u* is disconnected from the IP network 1 by unplugging the dedicated telephone terminal 60*u* from the personal computer 70*u* which is connected with the IP network 1.

More specifically speaking, if there is no reregistration of the IP address [x'.x'.x'.x'] by the personal computer 70*u* even after the expiration of the registration effective period of the IP address [x'.x'.x'.x'] transmitted from the communication unit 113 to the personal computer 70*u* by the communication unit 113, the terminal connection detection unit 115 instructs the call connection unit 114 to call the dedicated telephone terminal 60*u*. When the dedicated telephone terminal 60*u* returns no response to the call from the call connection unit 114 within a predetermined time period, the terminal connection detection unit 115 determines that the personal computer 70*u* is disconnected from the IP network 1.

Furthermore, when the terminal connection detection unit 115 determines that the dedicated telephone terminal 60*u* is no longer connected, the database server 12 is informed that the dedicated telephone terminal 60*u* is disconnected from the IP network 1.

The database server 12 includes a network IF unit 121, a user IF unit 122, an authentication unit 123, a setting update unit 124 and a storing unit 125 as shown in FIG. 3.

In this case, the configuration of the storing unit 125 will be explained with reference to FIG. 4. The storing unit 125 serves to store telephone numbers ([050-xxxx-] and the like) used by users, designation addresses and terminal identifiers in association with each other. Also, the storing unit 125 serves to further store users ID ([user_a] and the like) for identifying the users who utilize telephone numbers such as [050-xxxx-] and the passwords defined in connection with the users ID, respectively in association with the telephone numbers such as [050-xxxx-]. More specifically speaking, the storing unit 125 stores the telephone number table 125*a* and a terminal ID table 125*b*.

An entry of the telephone number table 125*a* contains the fields of "Assigned Telephone Number", "User ID", "Designation Address (Priority 1 to 5)" and "LF" (Location Free) indicating that the designation address is assigned to the personal computer 70*u*.

In the terminal ID table 125*b*, "Assigned Telephone Number" and "Terminal ID" are associated, while "Assigned Telephone Number" corresponds to "Assigned Telephone Number" of the telephone number table 125*a*.

Next, the functions of the other blocks of the database server 12 will be explained with reference to FIG. 3.

The network IF unit 121 is provided with an interface for connecting with the SIP server 11 and the call agent 13. The network IF unit 121 can be implemented with a LAN interface such as 100BASE-TX or 1000BASE-TX.

The user IF unit 122 serves to provide an interface through which the user U registers the forwarding addresses of the telephone number [050-xxxx-] used by the user U. For example, the user IF unit 122 can be implemented with a Web server connected with the Internet. The user IF unit 122 stores information acquired from the user U such as telephone numbers in the storing unit 125 through the setting update unit 124.

The authentication unit 123 serves to authenticate the dedicated telephone terminal 60*u* on the basis of the terminal ID [U1234-5678] as received by the SIP server 11 and the terminal ID of the dedicated telephone terminal 60*u* stored in the storing unit 125 (the terminal ID table 125*b*).

Also, the authentication unit 123 may authenticate the dedicated telephone terminal 60*u* by confirming the terminal ID [U1234-5678], the user ID [user_a] and the password associated with the user ID [user_a], which are received by the SIP server 11, on the basis of the user ID [user_a] and the password which are stored in the storing unit 125 (the telephone number table 125*a*).

When the dedicated telephone terminal 60*u* is authenticated by the authentication unit 123, the setting update unit 124 associates the IP address [x'.x'.x'.x'] received by the SIP server 11 with the telephone number [050-xxxx], which is stored in the storing unit 125 (the telephone number table 125*a*) in association with the terminal ID [U1234-5678] also received by the SIP server 11, and sets the IP address [x'.x'.x'.x] as the designation address which is given a priority higher than those of "Designation Address" stored in the storing unit 125 (the telephone number table 125*a*). In the present embodiment, the setting update unit 124 serves as a priority designation address setting unit.

In this case, FIG. 6 shows the content of the storing unit 125 (the telephone number table 125*a*) after the setting update unit 124 performs the process as described above. As has been discussed above, the IP address [x'.x'.x'.x'] assigned to the personal computer 70*u* is stored in "Designation Address (Priority 1)" associated with the telephone number [050-xxxx-], and "LF" is set to "1" to indicate that the designation address is assigned to the personal computer 70*u*.

On the other hand, as illustrated in FIG. 4, the IP address [x.x.x.x] of the IP telephone terminal 21*u*, which was stored in "Designation Address (Priority 1)" before the above process was performed, is stored in "Designation Address (Priority 2)". In like manner, the telephone numbers [03-xxxx-] and [090-xxxx-] are also put down respectively in the order of priority.

Furthermore, when the terminal connection detection unit 115 of the SIP server 11 detects that the dedicated telephone terminal 60*u* is disconnected from the IP network 1, the setting update unit 124 deregisters the priority designation address, i.e., the IP address [x'.x'.x'.x'] from the settings. More specifically speaking, when the terminal connection detection unit 115 notifies that the dedicated telephone terminal 60*u* is disconnected from the IP network 1, the setting update unit 124 restores the content of the storing unit 125 (the telephone number table 125*a*) relating to the telephone number [050-xxxx-] as shown in FIG. 4.

By the operation of the SIP server 11 and the database server 12 as described above, when the dedicated telephone terminal 60*u* is disconnected from the IP network 1, it is possible to connect a call at the telephone number [050-xxxx-] on the basis of the information on "Designation Address" which is stored in the storing unit 125 in advance. Incidentally, the IP address [x'.x'.x'.x'] may be erased every time the dedicated telephone terminal 60*u* is disconnected from the IP network 1, or alternatively it may, for example, be saved in a predetermined area of the storing unit 125 in a predetermined period, taking into consideration that a connection may be made again at the same IP address.

Also, the setting update unit 124 may store, in the storing unit 125 (the telephone number table 125*a*), information such as the telephone number and the like acquired from the user U and transmitted by the user IF unit 122.

The call agent 13 includes, as illustrated in FIG. 3, a network IF unit 131, a call connection unit 132 and a GW information storing unit 133.

The network IF unit 131 is provided with an interface for connecting with the SIP server 11, the database server 12 and the IP network 1. The network IF unit 131 can be implemented with a LAN interface such as 100BASE-TX or 1000BASE-TX.

In the case where a priority designation address, i.e., the IP address [x'.x'.x'.x'] is set in the telephone number table 125a of the database server 12, the call connection unit 132 connects a call at the telephone number [050-xxxx-] to the dedicated telephone terminal 60u on the basis of the IP address [x'.x'.x'.x']. Meanwhile, in the case of the present embodiment, a call connection unit is made up of the call connection unit 114 of the SIP server 11 and the call connection unit 132.

More specifically speaking, when receiving a call at the telephone number [050-xxxx-], the call connection unit 132 refers to the information stored in the telephone number table 125a on the basis of the telephone number [050-xxxx-]. In this case, when "LF" of "Designation Address (Priority 1)" associated with the telephone number [050-xxxx-] is set to "1", the call connection unit 132 transmits the IP address of the caller of that call and the IP address [x'.x'.x'.x'] stored in the telephone number table 125a to the SIP server 11.

Also, in the case where telephone numbers connectable through the gateway 1G, i.e., [03-xxxx-], [090-xxxx-] and the like are stored in "Designation Address" of the telephone number table 125a, the call connection unit 132 connects the call to the gateway 1G on the basis of the IP address of the gateway 1G stored in the GW information storing unit 133.

The GW information storing unit 133 serves to store the IP addresses of the gateways 1G which connect the IP network 1 with the PSTN 2 or the mobile telephone network 3 in association with the telephone numbers connectable through the gateway. For example, in the case of the present embodiment, the IP address of the gateway 1G connectable with the PSTN 2 is stored in association with telephone numbers which begin from "03".

(Communication Method Utilizing the Communication System in Accordance with the Embodiment of the Present Invention)

Figure 5:
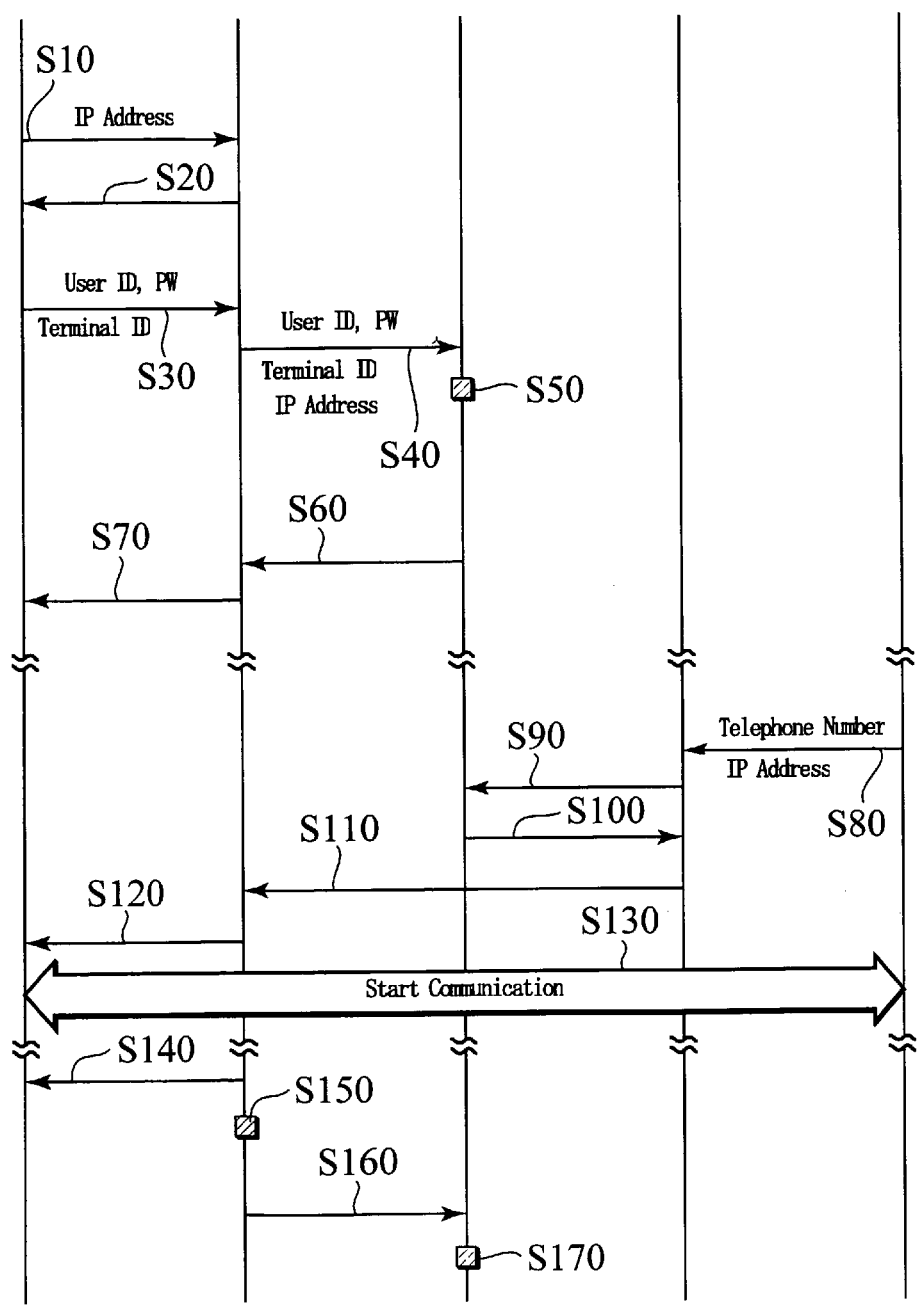
FIG. 5 is a view for showing a communication method in accordance with the first embodiment.

Next, the communication method of the communication system in accordance with the present embodiment will be explained with reference to FIG. 5.

At first, when the dedicated telephone terminal 60u is connected to the personal computer 70u connected with the IP network 1, the personal computer 70u transmits the IP address [x'.x'.x'.x'] assigned to the personal computer 70u to the SIP server 11 by the use of the "REGISTER" message of SIP in step S10. After receiving the "REGISTER" message, the SIP server 11 transmits a challenge value on the basis of MD5 or the like algorithm in step S20.

When the challenge value is received, the personal computer 70u transmits to the SIP server 11 a value calculated in accordance with MD5 or the like algorithm in step S30 on the basis of the user ID [user_a], the password associated with the user ID and the terminal ID [U1234-5678] stored in the dedicated telephone terminal 60u.

Next, the SIP server 11 transmits the user ID [user_a], the password and the terminal ID [U1234-5678], as received from the personal computer 70u, to the database server 12 in step S40.

The database server 12 authenticates the dedicated telephone terminal 60u on the basis of information as received from the SIP server 11 and information stored in the database server 12, and changes the entry in "Designation Address (Priority 1)" to the IP address [x'.x'.x'.x'] in step S50.

Next, the database server 12 notifies the SIP server 11 that the dedicated telephone terminal 60u is authenticated and that the entries of "Designation Address (Priority 1)" are updated in step S60.

The SIP server 11 notifies the personal computer 70u that the registration is completed on the basis of the database server 12 in step S70. Also, the SIP server 11 notifies the registration effective period of the IP address [x'.x'.x'.x'] with reference to the "expires" parameter of the SIP header.

When the above process is completed, the telephone number [050-xxxx-] stored in the database server 12 is changed as illustrated in FIG. 6.

Next, further with reference to FIG. 5, the process of connecting a call to the dedicated telephone terminal 60u will be explained.

For example, in the case where the IP telephone terminal 26 directs a call at the telephone number [050-xxxx-], the call agent 13 receives the telephone number and the IP address [y.y.y.y] of the IP telephone terminal 26 from the IP telephone terminal 26 in step S80. Then, the call agent 13 refers to the information stored in the database server 12 on the basis of the telephone number [050-xxxx-] as received in step S90. At this time, the call agent 13 acquires the IP address [x'.x'.x'.x'] associated with the telephone number [050-xxxx-], and recognizes that the IP address is assigned to the personal computer 70u since "LF" is set to "1" as illustrated in FIG. 6 in step S100.

The call agent 13 therefore transmits the IP address [x'.x'.x'.x'] and the IP address [y.y.y.y] of the IP telephone terminal 26 to the SIP server 11 in step S110.

The SIP server 11 connects a call from the IP telephone terminal 26 to the dedicated telephone terminal 60u on the basis of the information as received from the call agent 13 in step S120. Thereafter, the IP telephone terminal 26 and the dedicated telephone terminal 60u start communication therebetween in step S130.

Next is a description of the process to be taken when the dedicated telephone terminal 60u is disconnected from the personal computer 70u connected to the IP network 1.

If there is no reregistration of the IP address [x'.x'.x'.x'] by the personal computer 70u even after the expiration of the registration effective period of the IP address as notified to the personal computer 70u in step S70, the dedicated telephone terminal 60u connected to the personal computer 70u is called by the SIP server 11 in step S140.

When the dedicated telephone terminal 60u returns no response to the call in step S140, the SIP server 11 determines that the personal computer 70u is disconnected from the IP network 1 in step S150.

Meanwhile, in the case where only the dedicated telephone terminal 60u is unplugged from the personal computer 70u, the personal computer 70u can notify the SIP server 11 that the dedicated telephone terminal 60u is unplugged in accordance with SIP.

As a result of the determination in step S150 or on the basis of the notification from the personal computer 70u that the dedicated telephone terminal 60u is unplugged, the SIP server 11 notifies the database server 12 that the dedicated telephone terminal 60u or the personal computer 70u is disconnected in step S160.

On the basis of the notification from the SIP server 11, the association between the telephone number [050-xxxx-] and the priority designation address of the telephone number [050-xxxx-], i.e., the IP address [x'.x'.x'.x'] are released in the database server 12 in step S170.

When the process in step S170 is completed, the information stored in the database server 12 is changed as illustrated in FIG. 4.

(Operation and Effects Obtained in Accordance with the Communication System and the Communication Method of the Present Embodiment)

In accordance with the communication system and the communication method of the present embodiment, a call at the telephone number [050-xxxx-] of the user U is connected to the dedicated telephone terminal 60u on the basis of the IP address [x'.x'.x'.x'.] as transmitted from the dedicated telephone terminal 60u, and thereby the user U can receive the call at the telephone number [050-xxxx-] with the dedicated telephone terminal 60u.

In accordance with the present embodiment, since the IP address [x'.x'.x'.x'] as transmitted from the personal computer 70u is automatically set as a priority designation address accorded priority over the designation addresses which have been stored in the database server 12 in advance, it is possible to avoid the shortcoming that the user U has to manually change the designation address. Namely, the user U can selectively utilize two telephone terminals, to which the same telephone number [050-xxxx-] is assigned, i.e., the IP telephone terminal 21u and the dedicated telephone terminal 60u, without performing the change of "Designation Address" and so forth.

In the case of the present embodiment, since the dedicated telephone terminal 60u is authenticated on the basis of the terminal ID as transmitted from the dedicated telephone terminal 60u and the terminal ID as stored in the database server 12, it is possible to determine whether or not a service is to be provided for the dedicated telephone terminal 60u without the use of the user ID and the password of the user U.

In the case of the present embodiment, when the SIP server 11 detects that the dedicated telephone terminal 60u is disconnected from the personal computer 70u or that the personal computer 70u is disconnected from the IP network 1, the priority designation address as set is deregistered, and thereby the call agent 13 can connect a call at the telephone number [050-xxxx-] on the basis of the designation addresses which are prepared in the database server 12 in the case where the dedicated telephone terminal 60u or the personal computer 70u is disconnected from the IP network 1.

In the case of the present embodiment, the dedicated telephone terminal 60u is authenticated on the basis of the user ID and the password in addition to the terminal ID as transmitted from the dedicated telephone terminal 60u, and thereby it is possible to improve the security against the illegal usage of the service.

In the case of the present embodiment, since the dedicated telephone terminal 60u is provided further with the terminal ID storing unit 65 capable only of reading the terminal ID while the registration information transmitting unit 73 transmits the terminal ID as read from the terminal ID storing unit 65, it is possible to prevent the terminal ID from being changed by the user and so forth, and improve the security against the illegal usage of the service.

In the case of the present embodiment, since the personal computer 70u is provided further with the user information storing unit 72 capable of storing the user ID and the password while the registration information transmitting unit 73 transmits the user ID and the password as stored in the terminal ID storing unit and the user information storing unit 72, it is possible to avoid the shortcoming that the user U has to enter the user ID and the password every time the connection is made.

Second Embodiment

Figure 7:
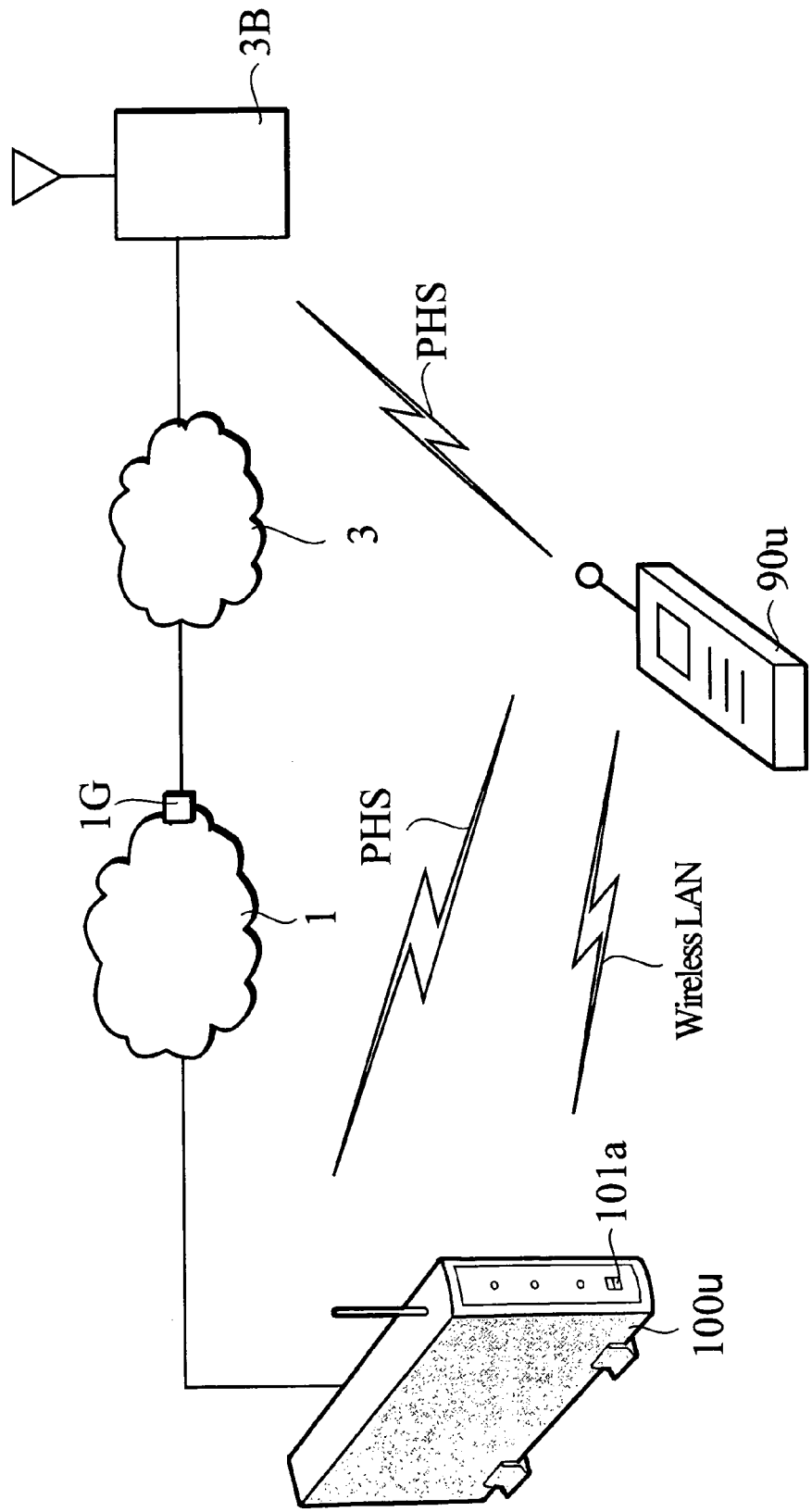
FIG. 7 is a view for showing the configuration of a terminal device in accordance with a second embodiment.

Next, the second embodiment will be explained with reference to the accompanying drawings. In the case of the present embodiment, as illustrated in FIG. 7, the terminal system explained in conjunction with the above first embodiment is substituted with a terminal system which is made up of a private base station apparatus 100u which can be connected with the IP network 1 and a mobile terminal device 90u which can be connected with the IP network 1 through either the private base station apparatus 100u or a public wireless base station 3B.

The mobile terminal device 90u can be carried by the user U for mobile communications, and is given a telephone number [070-xxxx-] and the IP address [x'.x'.x'.x']. This mobile terminal device 90u is used to perform wireless communication with the wireless base station 3B by the use of the PHS protocol, able to access the IP network 1 through the mobile telephone network 3, and able to make an IP telephone call through the IP network 1 on the basis of the VoIP technique.

Also, this mobile terminal device 90u is capable of performing wireless communication with the private base station apparatus 100u by the use of the same PHS protocol as used with the wireless base station 3B, and capable of making an IP telephone call through the IP network 1 by accessing the IP network 1 through the private base station apparatus 100u. Furthermore, the mobile terminal device 90u can connect with the private base station apparatus 100u also through a wireless LAN such as IEEE802.11 and can make an IP telephone call through this wireless LAN. This connection can be switched between the PHS system or the wireless LAN automatically depending upon the communication environment (radio wave condition) or manually by a user's operation.

The private base station apparatus 100u is a device designed by incorporating a private base station capability based on the PHS standard and a wireless LAN capability within the dedicated terminal adapter 80u or the IP telephone terminal 21u as described above, and can be used for making an IP telephone call with a telephone equipment connected thereto, and making an IP telephone call with the mobile terminal device 90u by wireless communication. In other words, in the case of the present embodiment, the private base station apparatus 100u serves to perform the same functions as the wireless base station 3B as discussed above within a predetermined area in which wireless radio waves can reach, and the user U can perform communication on the basis of the PHS system through the private base station apparatus 100u even in the location where radio waves cannot reach from the wireless base station 3B.

Also, the private base station apparatus 100u of the present embodiment is provided with a wireless communication capability on the basis of the PHS system and a change-over switch 101a of the wireless LAN, and capable of arbitrarily switching between the PHS system and the wireless LAN in accordance with the needs of the user.

Figure 8:
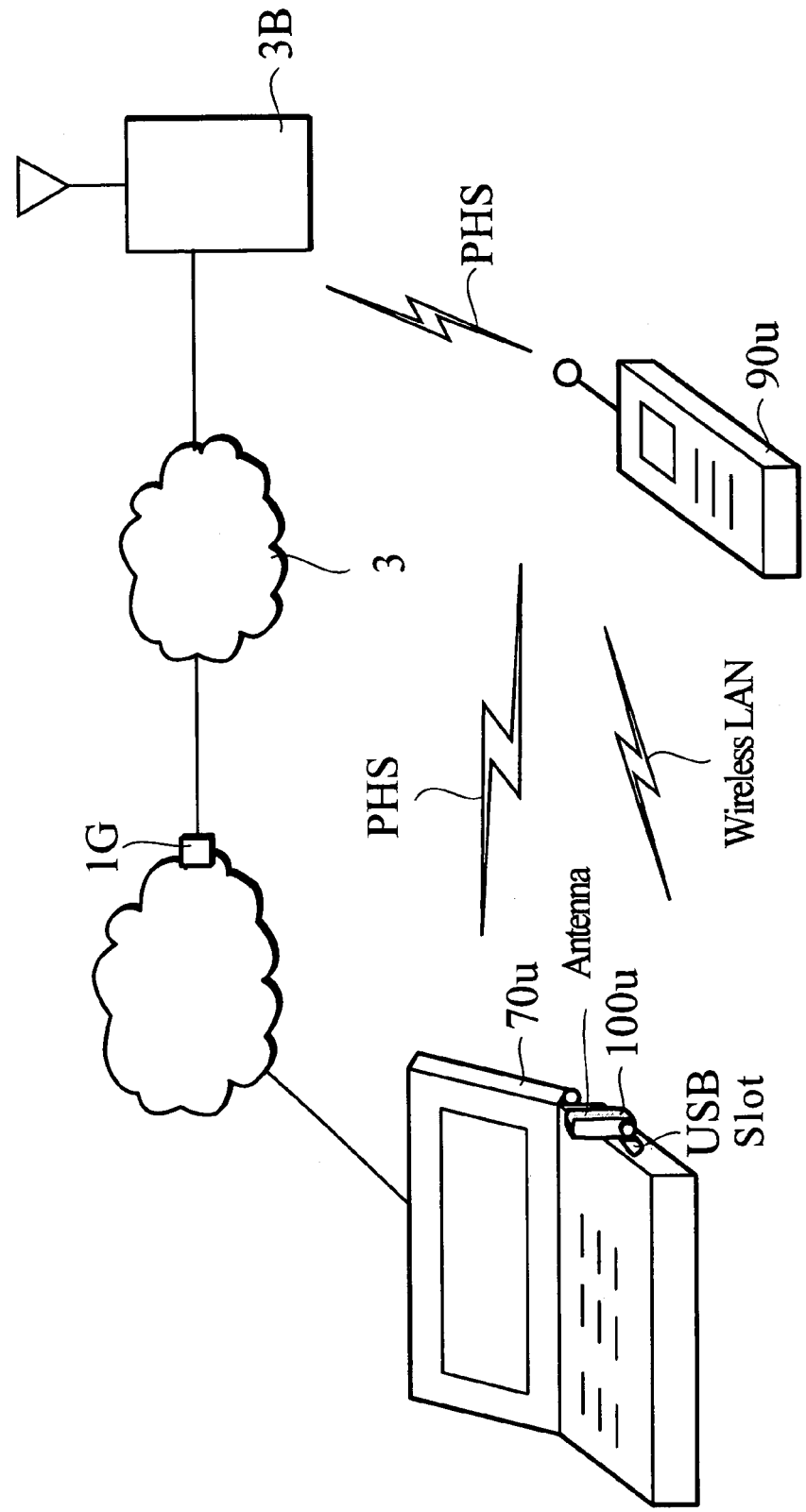
FIG. 8 is a view for showing the configuration of a terminal device in accordance with the second embodiment.

Meanwhile, as illustrated in FIG. 8, the private base station apparatus 100u may be designed as an antenna adapter device which can be inserted into the personal computer 70u in order to cooperate with the personal computer 70u. More specifically speaking, the private base station apparatus 100u may be designed as an adapter which can be attached to or detached from a card slot or a USB slot of the computer 70u in order to provide the personal computer 70u with communication antenna functionality for wireless communication with the mobile terminal device 90u.

Next, with reference to FIG. 9, the function block configuration of the mobile terminal device 90u in accordance with the present embodiment and the function block configuration of the private base station apparatus 100u will be explained.

Figure 9:
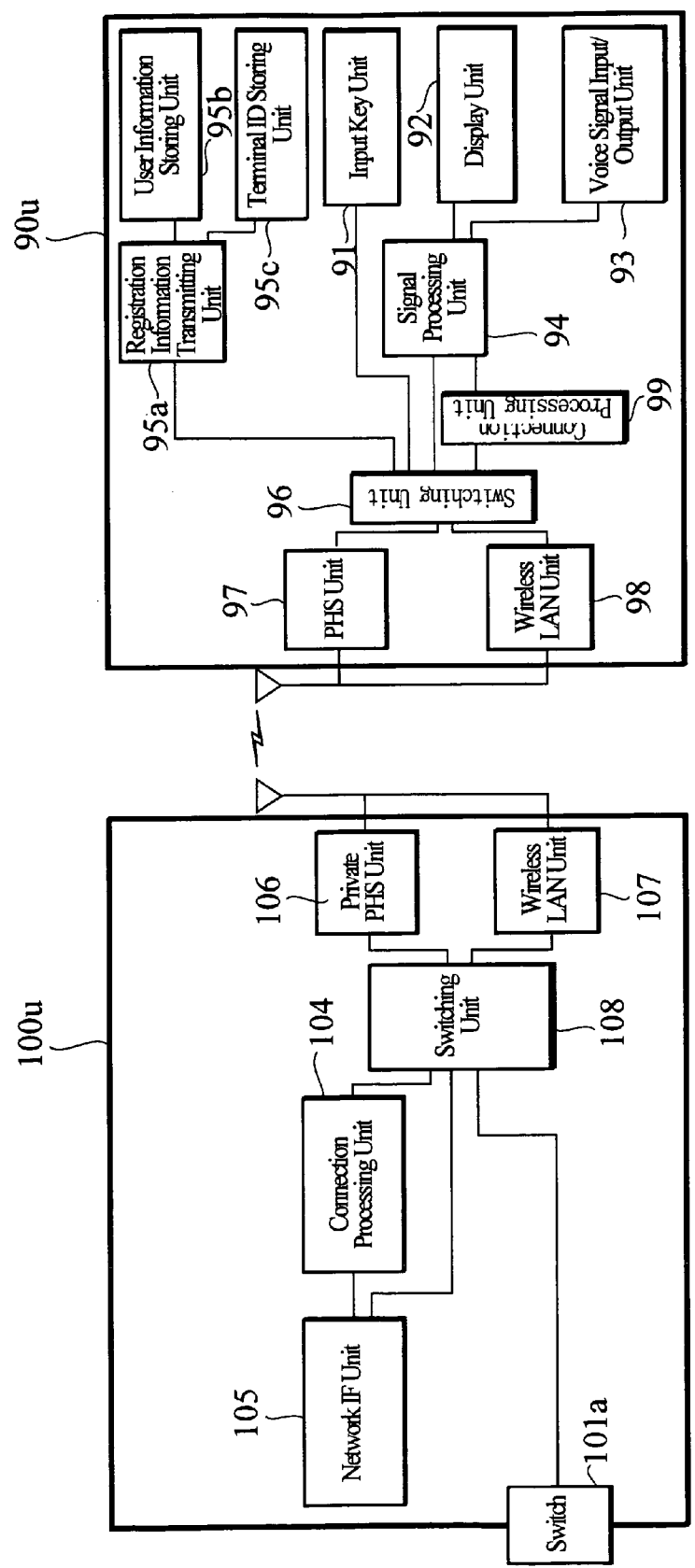
FIG. 9 is a view for showing the configuration of the function blocks of the terminal device in accordance with the second embodiment.

As shown in FIG. 9, the mobile terminal device 90u is provided with an input key unit 91, a display unit 92, a voice signal input/output unit 93, a signal processing unit 94 and a connection processing unit 99.

The input key unit 91 is used to input numerals such as a telephone number and desired characters. The data of numerals and characters as input through the input key unit 91 is transmitted to the signal processing unit 94. The display unit 92 serves to display the content of the data input through the input key unit 91, the telephone number of the caller and so forth, and is connected to the signal processing unit 94. The voice signal input/output unit 93 is provided with a microphone and a speaker and serves to transmit and receive voice band signals to and from the signal processing unit 94.

The signal processing unit 94 serves to perform conversion between digital signals in conformity with a predetermined standard and voice band signals transmitted to and received from the voice signal input/output unit 93, and convert the digital signals as converted into IP packets. Also, the signal processing unit 94 are connected with the input key unit 91 and the display unit 92 in order to transmit and receive data such as a telephone number. For example, the signal processing unit 94 can be implemented with a codec in compliance with ITU-T G.729a/b. Furthermore, the signal processing unit 94 serves to perform conversion between IP packets and digitized data such as voice signals and a telephone number.

The connection processing unit 99 is a module for performing communication with the SIP server 11 when connecting directly with the wireless base station 3b through a PHS unit 97. More specifically speaking, the connection processing unit 104 transmits to the SIP server 11 the terminal ID [U1234-5678], the IP address [x'.x'.x'.x'], the user ID [user_a] and the password on the basis of SIP (Session Initiation Protocol) as described above. Furthermore, when the IP address [x'.x'.x'.x'] as transmitted is registered in the database server 12, the connection processing unit 104 receives the information (the "expires" parameter of the SIP header) indicative of the registration effective period of the IP address from the SIP server 11.

The connection processing unit 99 transmits the IP address, the user ID and the password to the SIP server 11 again in advance of the expiration of the registration effective period on the basis of information on the registration effective period of the IP address as received, in order to register the IP address in the database server 12 again. In addition, when connecting directly with the wireless base station 3b, the connection processing unit 99 performs the call connection process between the SIP server 11 and the mobile terminal device 90u on the basis of SIP (Session Initiation Protocol), i.e., the processing of connecting a call at the telephone number [070-xxxx-] used by the user U.

Furthermore, the mobile terminal device 90u is provided with a registration information transmitting unit 95a, a user information storing unit 95b and a terminal ID storing unit 95c.

The user information storing unit 95b serves to store a user ID for identifying the user U and a password associated with the user ID. In the case of the present embodiment, the user information storing unit 95b stores the user ID [user_a] of the user U and a password associated with this user ID. Also, the user ID and the password are stored in the database server 12 in association with the telephone number [070-xxxx-] used by the user U.

When the mobile terminal device 90u is connected with the IP network 1, the user ID and the password stored in the user information storing unit 95b are automatically transmitted to the SIP server 11 together with the terminal ID, and thereby it is possible to avoid the shortcoming that the user U has to enter information such as the user ID every time the connection is made.

Also, when the mobile terminal device 90u is connected with the IP network 1 which can be used for communication with the SIP server 11, the registration information transmitting unit 95a transmits to the SIP server 11 the terminal ID for identifying the mobile terminal device 90u and the address for identifying the location of the terminal on the IP network 1, i.e., the IP address [x'.x'.x'.x'] for identifying the location of the mobile terminal device 90u connected to the IP network 1.

In addition to this, the registration information transmitting unit 95a can further transmit the user ID and the password of the user U to the SIP server 11. In this case, it is determined in accordance with the security level as required whether or not the user ID and the password are transmitted in addition to the terminal ID and the IP address.

The terminal ID storing unit 95c serves as a memory from which the terminal ID (terminal identifier) assigned to the mobile terminal device 90u is transmitted to the registration information transmitting unit 95a.

In this case, the terminal ID assigned to the mobile terminal device 90u is an identifier unique to the mobile terminal device 90u. In the case of the present embodiment, a serial number in the form of [Uxxxx-xxxx] is used, and [U1234-5678] is assigned to the mobile terminal device 90u. Meanwhile, the terminal ID is stored in the database server 12 in association with the telephone number [070-xxxx-] used by the user U. Alternatively, instead of the serial number in the form of [Uxxxx-xxxx], the MAC (Media Access Control) address of the mobile terminal device 90u can be used as the terminal ID.

The serial number is written to a FLASH memory and the like in order that it cannot be rewritten for the purpose of illegally using the IP telephone service. Accordingly, it is difficult to change the serial number, and thereby the security against the illegal usage of the IP telephone service can be improved.

Furthermore, the mobile terminal device 90u is provided with the PHS unit 97 which is a communication interface for wireless communication by the use of the communication protocol on the basis of the PHS system, a wireless LAN unit 98 which is a communication interface for local communication such as a wireless LAN, and a switching unit 96 for switching between the PHS unit 97 and the wireless LAN unit 98.

The PHS unit 97 is a module for performing wireless communication by the use of the PHS protocol with the wireless base station 3B or a private PHS unit 106 provided in the private base station apparatus 100u. The wireless LAN unit 98 is a module for performing wireless communication in compliance with IEEE802.11 and so forth with a wireless LAN unit 107 provided in the private base station apparatus 100u. The connection switching unit 96 is a change-over switch for selectively connecting the PHS unit 97 or the wireless LAN unit 98 on the basis of the user manipulation through the input key unit 91 and the strength of the received radio waves determined by the signal processing unit 94.

On the other hand, the private base station apparatus 100u is provided with a connection processing unit 104 and a network IF unit 105.

The connection processing unit 104 is a module for communicating with the SIP server 11 through the network IF unit 105. More specifically speaking, the connection processing unit 104 transmits to the SIP server 11 the terminal ID

[U1234-5678], the IP address [x'.x'.x'.x'], the user ID [user_a] and the password on the basis of SIP (Session Initiation Protocol) as described above. Furthermore, when the IP address [x'.x'.x'.x'] as transmitted is registered in the database server 12, the connection processing unit 104 receives the information (the "expires" parameter of the SIP header) indicative of the registration effective period of the IP address from the SIP server 11. Also, the connection processing unit 104 transmits the IP address, the user ID and the password to the SIP server 11 again in advance of the expiration of the registration effective period on the basis of information on the registration effective period of the IP address as received, in order to register the IP address in the database server 12 again.

Furthermore, the connection processing unit 104 performs the call connection process between the SIP server 11 and the mobile terminal device 90u, i.e., the processing of connecting a call at the telephone number [070-xxxx-] used by the user U on the basis of SIP (Session Initiation Protocol). Still further, the connection processing unit 104 periodically determines whether or not the mobile terminal device 90u is connected with the private base station apparatus 100u. When the mobile terminal device 90u is disconnected from the private base station apparatus 100u, the connection processing unit 104 notifies this fact to the SIP server 11.

The network IF unit 105 is provided with an interface connectable to the IP network 1. For example, the network IF unit 105 can be implemented with a LAN interface such as 100BASE-TX in compliance with IEEE802.3u. Incidentally, an ADSL (Asymmetric Digital Subscriber Line) modem may also be used to make the connection between the IP network 1 and the private base station apparatus 100u depending upon the type of the communication line used for accessing the IP network 1.

Furthermore, the private base station apparatus 100u is provided with the private PHS unit 106 which is a communication interface for wireless communication by the use of the communication protocol on the basis of the PHS system, a wireless LAN unit 107 which is a communication interface for local communication such as a wireless LAN, and a switching unit 108 for switching between the private PHS unit 106 and the wireless LAN unit 107.

The private PHS unit 106 is a module for performing wireless communication by the use of the PHS protocol with the PHS unit 97 provided in the mobile terminal device 90u. The wireless LAN unit 107 is a module for performing wireless communication in compliance with IEEE802.11 and so forth with the wireless LAN unit 98 provided in the mobile terminal device 90u. The switching unit 108 is a change-over switch for selectively connecting the private PHS unit 106 or the wireless LAN unit 107 to the connection processing unit 104 and the network IF unit 105 on the basis of the user manipulation through the switch 101a and the strength of the received radio waves determined by the private PHS unit 106 or the wireless LAN unit 107.

(Outline of the Operation of the Communication System)

Figure 10:
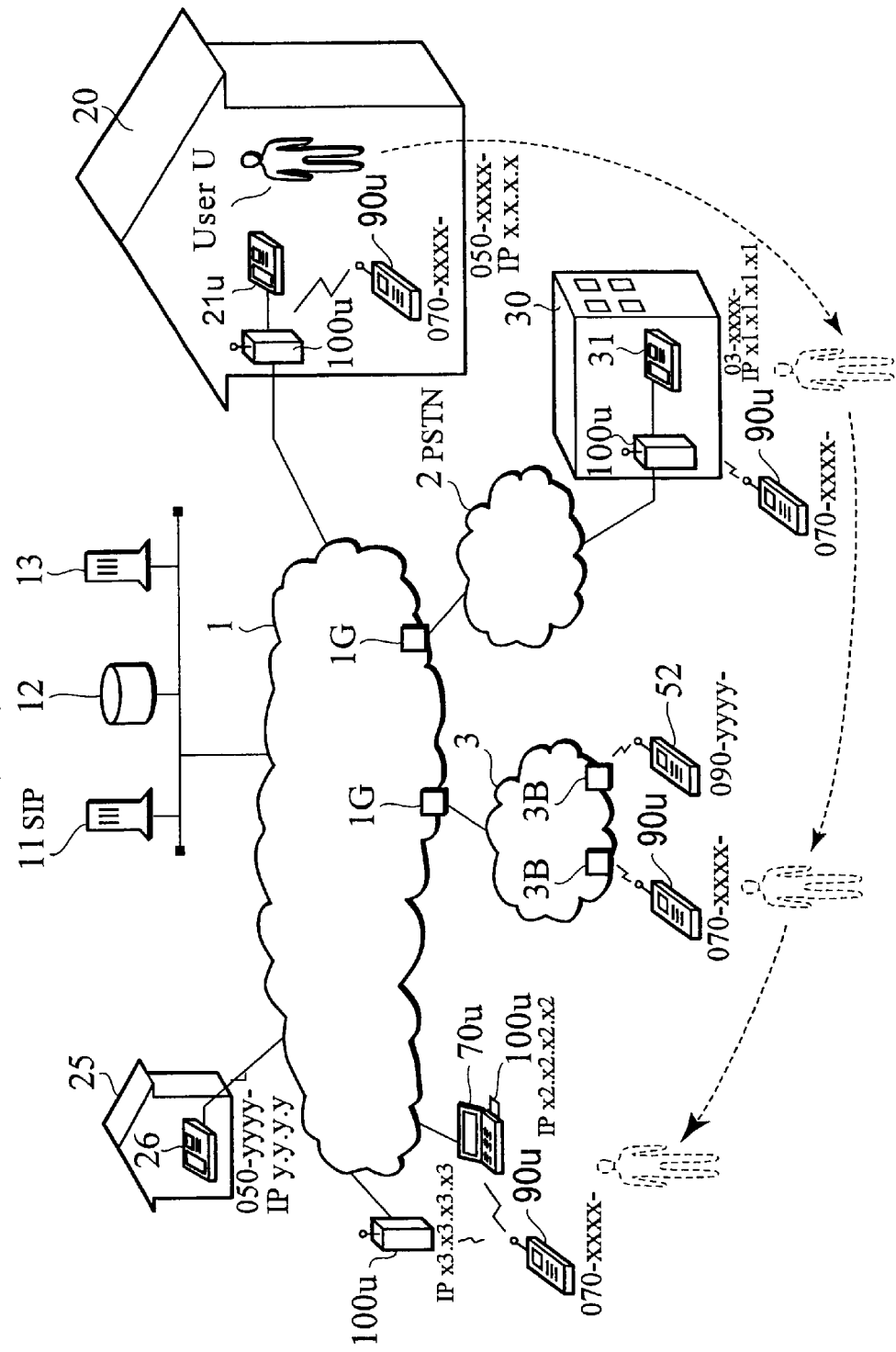
FIG. 10 is a view for schematically showing the configuration of the network of a communication system in accordance with the second embodiment.

Next, the general outline of the communication system in accordance with the present embodiment as described above will be explained. FIG. 10 is an explanatory view for showing the operation of the communication system.

For example, in the case where the user of the user's house 25 directs a call from the IP telephone terminal 26 to the IP telephone terminal 21u used by the user U and placed in the user's house 20, at first, the call agent 13 receives the telephone number [050-xxxx-] assigned to the IP telephone terminal 21u from the IP telephone terminal 26 together with the IP address [y.y.y.y]. Then, the call agent 13 refers to the database server 12 on the basis of the telephone number [050-xxxx-] as received.

Figure 11:
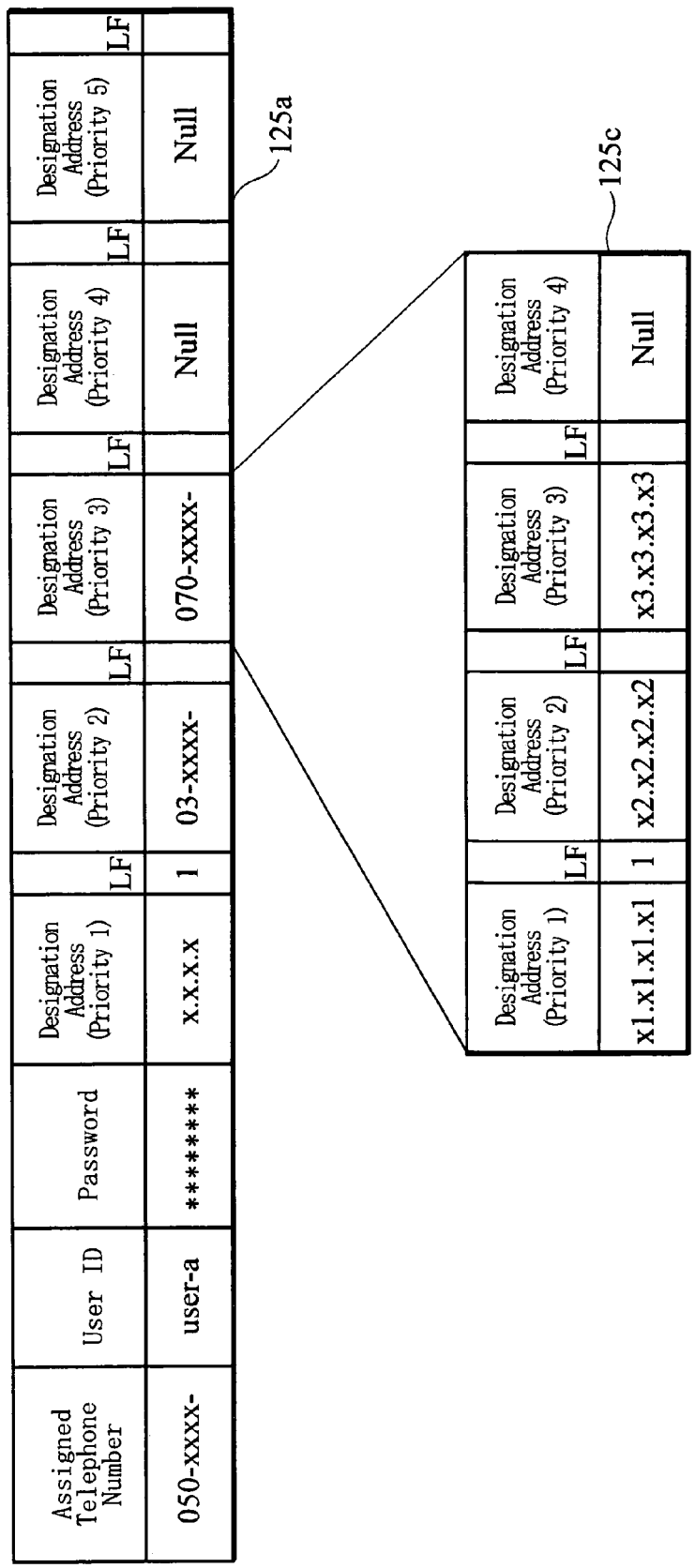
FIG. 11 is a view for showing the content of the database when a terminal device is connected with a network in accordance with the second embodiment.

In this case, for example, the database server 12 stores information as shown in a telephone number table 125a of FIG. 11. The call agent 13 acquires the IP address [x.x.x.x] which is an entry of "Designation Address (Priority 1)" in the telephone number table 125a corresponding to [050-xxxx-] which is an entry of "Assigned Telephone Number". The call agent 13 connects the IP telephone terminal 26 and the IP telephone terminal 21u on the basis of the IP address [x.x.x.x] as acquired from the database server 12 and the IP address [y.y.y.y] as received from the IP telephone terminal 26.

In addition to this, the database server 12 of the present embodiment can store the telephone numbers of forwarding addresses to which calls at predetermined telephone numbers are transferred. For example, in the telephone number table 125a, the assigned telephone number [050-xxxx-] is associated with the IP address [x.x.x.x] stored as an entry of "Designation Address (Priority 1)" as described above and also with the telephone number [070-xxxx-] of the mobile terminal device 90u carried by the user U as an entry of "Designation Address (Priority 4)".

In the case of the present embodiment, this telephone table 125a is made up in a layered structure including a lower table 125c corresponding to the assigned telephone number [070-xxxx-], and the lower table 125c contains the IP address of the private base station apparatus 100u connectable to the mobile terminal device 90u. For example, the IP address [[x1.x1.x1.x1] of the private base station apparatus 100u placed in the office 30 of the user U is stored as "Designation Address (Priority 2)", and the IP address [[x2.x2.x2.x2] of the private base station apparatus 100u connected to the personal computer 70u used by the user U is stored as "Designation Address (Priority 3)". Incidentally, the user U can store the telephone number of the ordinary telephone terminal 31 or the telephone number of the mobile telephone terminal 51u in the database server 12 through the Internet and the like.

In the case where a plurality of designation addresses are stored in the database server 12, the call agent 13 can connect a call at the assigned telephone number ([050-xxxx-]) on the basis of the priority level of the designation address.

For example, while the call agent 13 is capable of calling the IP telephone terminal 21u on the basis of the IP address [x.x.x.x] stored as "Designation Address (Priority 1)", if the IP telephone terminal 21u returns no response to the call from the call agent 13 within a predetermined time period, the call agent 13 halts calling the IP telephone terminal 21u and can call the ordinary telephone terminal 31 at the telephone number [03-xxxx-] which is stored as "Designation Address (Priority 2)".

Furthermore, when calling the mobile terminal device 90u, the call agent 13 directs a call at the telephone number [070-xxxx-] by the use of the PHS system to the mobile terminal device 90u, and if no response is returned within a predetermined time period, the IP addresses of the respective private base station apparatuses 100u are used in turn for making an IP telephone call. Meanwhile, the user U can change the priority levels of a plurality of the "designation addresses" in accordance with the time of day by further storing predetermined information in the database server 12.

By the operations of the database server 12 and the call agent 13 as has been discussed above, it is possible to transfer a call at the telephone number [050-xxxx-] used by the user U to a predetermined telephone terminal in accordance with the location where the user U stays.

Furthermore, in the case of the present embodiment, when the user U connects the mobile terminal device 90u to the IP network 1 through one of the private base station apparatuses 100u, the IP address assigned to that private base station apparatus 100u is set through the SIP server 11 as an entry of "Designation Address" stored in the database server 12 as described above.

Accordingly, the user U can receive a call at the telephone number [050-xxxx-], for example even when traveling and so forth, through the use of the private base station apparatus 100u and the mobile terminal device 90u without changing "Designation Address" stored in the database server 12 by himself by connecting the mobile terminal device 90u to the IP network 1 through the private base station apparatus 100u.

Since the communication system in accordance with the present embodiment operates as has been discussed above, the user U can selectively use two telephone terminals, i.e., the IP telephone terminal 21u and the dedicated telephone terminal 60u which are associated with the same telephone number [050-xxxx-] without performing the change of "Designation Address" and so forth.

Particularly, in the case of the present embodiment, the private base station apparatus 100u is used to perform a communication with the mobile terminal device 90u on the basis of the PHS system, and thereby the user can make an IP telephone call at the PHS telephone number assigned to the mobile terminal device 90u. Also, in the case where an antenna adapter is used as the private base station apparatus 100u which is removably attached to the personal computer 70u, it is possible to make use of the PHS telephone in the same manner as usual by providing the private PHS antenna station even in the location where radio waves cannot reach from the wireless base station 3B, such as an abroad location, as long as there is a personal computer available for connecting with the IP network 1.

INDUSTRIAL APPLICABILITY

As has been explained above, in accordance with the present invention, a communication system, a call connection server, a terminal device and a communication method can be provided for automatically transmitting from a terminal device the information for identifying the terminal device and the information for indicating the location of the terminal device on a network, changing the information of the call connection server on the basis of the information as transmitted, and thereby connecting a call at a predetermined telephone number to the terminal device.

What is claimed is:

1. A communication system comprising:
a private base station apparatus that is configured to connect with an IP network by transmitting and receiving IP packets;
a mobile terminal device configured to connect to said IP network by wireless communication through either a public wireless base station or said private base station apparatus;
an IP telephone terminal that is configured to talk through said private base station apparatus with said IP network by transmitting and receiving IP packets; and
a call connection server configured to connect a call at a predetermined telephone number of said IP telephone terminal to either said IP telephone terminal or said mobile terminal device on the basis of a designation address of said IP telephone terminal which is associated with said predetermined telephone number, said mobile terminal device comprising:
a registration information transmitting unit configured to transmit, when connecting with said IP network which can be used for communication with said call connection server, to said call connection server a terminal identifier for identifying said mobile terminal device and a terminal location address for identifying the location of the current private base station apparatus on said IP network with which said mobile terminal device is connected, and said call connection server comprising:
a storing unit configured to store said designation address and said terminal identifier in association with said predetermined telephone number;
a registration information receiving unit configured to receive said terminal identifier and said terminal location address;
an authentication unit configured to authenticate said mobile terminal device on the basis of said terminal identifier which is received and said terminal identifier which is stored in said storing unit;
a priority designation address setting unit configured to associate, when said mobile terminal device is authenticated by said authentication unit, said terminal location address as received and said predetermined telephone number, which is stored in said storing unit in association with said terminal identifier, and set said terminal location address as a priority designation address which is given a priority higher than said designation address; and
a call connection unit configured to connect said call to said mobile terminal device on the basis of said terminal location address in the case where said priority designation address has been set up.

2. The communication system as claimed in claim 1 wherein said call connection server further comprises a detection unit configured to detect that said mobile terminal device is disconnected from said IP network, and wherein
when said detection unit detects that said mobile terminal device is disconnected from said IP network, said priority designation address setting unit deregisters said priority designation address as set.

3. The communication system as claimed in claim 1 wherein said storing unit is configured to further store, in association with said predetermined telephone number, a user identifier for identifying a user who utilizes said predetermined telephone number and a password associated with said user identifier; wherein said registration information transmitting unit is configured to further transmit said user identifier and said password to said call connection server;
wherein said registration information receiving unit is configured to receive said user identifier and said password; and
wherein said authentication unit is configured to authenticate said mobile terminal device on the basis of said terminal identifier, said user identifier and said password as received.

4. The communication system as claimed in claim 1 wherein said mobile terminal device further comprises a terminal identifier storing unit configured to store said terminal identifier in order that said terminal identifier can be read only by said registration information transmitting unit; and wherein
said registration information transmitting unit is configured to transmit said terminal identifier as read from said terminal identifier storing unit to said call connection server.

5. The communication system as claimed in claim 3 wherein said mobile terminal device further comprises a user information storing unit configured to store said user identifier and said password; and wherein said registration information transmitting unit is configured to transmit said terminal identifier and said user identifier and password stored in said user information storing unit to said call connection server.

6. The communication system as claimed in claim 1, wherein said mobile terminal device is configured to perform wireless communication with said private base station apparatus by the use of the same protocol as it uses for the wireless communication with said public wireless base station.

7. The communication system as claimed in claim 6 wherein each of said mobile terminal device and said private base station apparatus comprises:

a first communication interface operable on the basis of said protocol;

a second communication interface operable for local communication; and a switch unit operable to switch between said first communication interface and said second communication interface in accordance with the manipulation of a user.

8. The communication system as claimed in claim 6 wherein said private base station apparatus comprises: an adapter unit which is attached to a computer and is removable from the computer; and a communication antenna unit configured for wireless communication with said mobile terminal device.

9. A call connection server which is part of a communication system that includes a private base station apparatus configured to connect with an IP network by transmitting and receiving IP packets, a mobile terminal device configured to connect with said IP network by wireless communication through either a public wireless base station or said private base station apparatus, and an IP telephone terminal configured to talk through said private base station apparatus with said IP network by transmitting and receiving IP packets, said call connection server comprising:

a storing unit configured to store said designation address of said IP telephone terminal and said terminal identifier in association with said predetermined telephone number of said mobile terminal device;

a registration information receiving unit configured to receive, when said mobile terminal device is connected with an IP network which can be used for communication with said call connection server, from said mobile terminal device a terminal identifier for identifying said mobile terminal device and a terminal location address for identifying the location of the current private base station apparatus on said IP network with which said mobile terminal device is connected;

an authentication unit configured to authenticate said mobile terminal device on the basis of said terminal identifier which is received and said terminal identifier which is stored in said storing unit;

a priority designation address setting unit configured to associate, when said mobile terminal device is authenticated by said authentication unit, said terminal location address as received and said predetermined telephone number, which is stored in said storing unit in association with said terminal identifier, and set said terminal location address as a priority designation address which is given a priority higher than said designation address; and a call connection unit configured to connect said call to said mobile terminal device on the basis of said terminal location address in the case where said priority designation address has been set up.

10. The call connection server as claimed in claim 9 further comprising a detection unit configured to detect that said mobile terminal device is disconnected from said IP network, wherein when said detection unit detects that said mobile terminal device is disconnected from said IP network, said priority designation address setting unit deregisters said priority designation address as set.

11. The call connection server as claimed in claim 9 wherein said storing unit is configured to further store, in association with said predetermined telephone number, a user identifier for identifying a user who utilizes said predetermined telephone number and a password associated with said user identifier, wherein said registration information receiving unit is configured to further receive said user identifier and said password from said mobile terminal device; and wherein said authentication unit is configured to authenticate said mobile terminal device on the basis of said terminal identifier, said user identifier and said password as received.

12. A mobile terminal device which is part of a communication system that includes a private base station apparatus configured to connect with an IP network by transmitting and receiving IP packets, an IP telephone terminal configured to talk through said private base station apparatus with said IP network by transmitting and receiving IP packets, and a call connection server configured to connect a call at a predetermined telephone number of said IP telephone terminal to either said IP telephone terminal or said mobile terminal device on the basis of a designation address of said IP telephone terminal which is associated with said predetermined telephone number, wherein said mobile terminal device is provided with a registration information transmitting unit configured to transmit, when it is connected with said IP network, a terminal identifier and a terminal location address to said call connection server, said terminal location address is for identifying the location of the current private base station apparatus on said IP network which can be used for communication with said call connection server from said mobile terminal device, and associates said terminal location address as received and said predetermined telephone number, and sets said terminal location address as a priority designation address which is given a priority higher than said designation address, and wherein said mobile terminal device is configured to connect with said IP network by wireless communication through either a public wireless base station or said private base station apparatus.

13. The mobile terminal device as claimed in claim 12 further comprising a terminal identifier storing unit configured to store said terminal identifier in order that said terminal identifier can be read only by said registration information transmitting unit, wherein said registration information transmitting unit is configured to transmit said terminal identifier as read from said terminal identifier storing unit to said call connection server.

14. The mobile terminal device as claimed in claim 12 wherein said call connection server is configured to authenticate said mobile terminal device on the basis of said terminal identifier, a user identifier for identifying a user who utilizes said predetermined telephone number and said user identifier; wherein said mobile terminal device further comprises: a user information storing unit configured to store said user identifier and said password; and wherein said registration information transmitting unit is configured to transmit said terminal identifier and said user identifier and password stored in said user information storing unit to said call connection server.

15. The mobile terminal device as claimed in claim 12 wherein said mobile terminal device is configured to perform wireless communication with said private base station apparatus by the use of the same protocol as it uses for the wireless communication with said public wireless base station.

16. The mobile terminal device as claimed in claim 15, wherein each of said terminal device and said private base station apparatus comprises:

a first communication interface operable on the basis of said protocol;

a second communication interface operable for local communication; and a switch unit operable to switch between said first communication interface and said second communication interface in accordance with the manipulation of a user.

17. The mobile terminal device as claimed in claim 15 wherein said private base station apparatus is provided with:
an adapter unit which is attached to a computer and is removable from the computer; and a communication antenna unit configured for wireless communication with said mobile terminal device.

18. A communication method for a communication system that includes a private base station apparatus configured to connect with an IP network by transmitting and receiving IP packets, a mobile terminal device configured to connect with said IP network by wireless communication through either a public wireless base station or said private base station apparatus, an IP telephone terminal configured to talk through said private base station apparatus with said IP network by transmitting and receiving IP packets; and a call connection server configured to connect a call at a predetermined telephone number of said IP telephone terminal to either said IP telephone terminal or said mobile terminal device on the basis of a designation address of said IP telephone terminal which is associated with said predetermined telephone number, wherein said call connection server is configured to store said designation address and said terminal identifier in association with said predetermined telephone number, said communication method comprising:

a step (A) in which, when said mobile terminal device is connected with a IP network which can be used for communication with said call connection server, said call connection server receives from said mobile terminal device a terminal identifier for identifying said mobile terminal device and a terminal location address for identifying the location of the current private base station apparatus on said IP network with which said mobile terminal device is connected;

a step (B) in which said call connection server authenticates said mobile terminal device on the basis of said terminal identifier and said terminal identifier as stored;

a step (C) in which, when said mobile terminal device is authenticated in said step (B), said call connection server associates said terminal location address as received and said predetermined telephone number, which is stored in association with said terminal identifier, and sets said terminal location address as a priority designation address which is given a priority higher than said designation address; and a step (D) in which, in the case where said priority designation address has been set up, said call connection server connects said call to said mobile terminal device on the basis of said terminal location address.

19. The communication method as claimed in claim 18 further comprising:

a step (E) in which said call connection server detects that said mobile terminal device is disconnected from said IP network; and a step (F) in which, when it is detected in said step (E) that said mobile terminal device is disconnected from said IP network, said server deregisters said priority designation address which is set in said step (C).

20. The communication method as claimed in claim 18 wherein a user identifier for identifying a user who utilizes said predetermined telephone number and a password associated with said user identifier are further stored in association with said predetermined telephone number, wherein said call connection server receives said user identifier and said password from said mobile terminal device in said step (A), wherein said call connection server authenticates said mobile terminal device on the basis of said terminal identifier, said user identifier and said password as received in said step (B).

21. The communication method as claimed in claim 18 wherein said call connection server receives said terminal identifier, which is stored inside of said mobile terminal device so that it can only be read, from said mobile terminal device in said step (A).

22. The communication method as claimed in claim 20 wherein said call connection server receives said user identifier and said password, which are stored inside of said mobile terminal device, from said mobile terminal device in said step (A).

23. The communication method as claimed in claim 18 wherein said mobile terminal device connects with said IP network in said step (A) by establishing wireless communication with said private base station apparatus by the use of the same protocol as it uses for the wireless communication with said public wireless base station.

* * * * *